United States Patent [19]

Wang et al.

[11] Patent Number: 5,249,181
[45] Date of Patent: Sep. 28, 1993

[54] CALL PROCESSING USING LOGICAL CHANNEL ASSIGNMENTS

[75] Inventors: Theresa C. Y. Wang, Scottsdale; Steven H. Moritz, Phoenix, both of Ariz.

[73] Assignee: Motorola, Inc., Schaumburg, Ill.

[21] Appl. No.: 857,537

[22] Filed: Mar. 25, 1992

[51] Int. Cl.$^5$ ............................................. H04L 12/56
[52] U.S. Cl. .................................... 370/60; 370/94.1; 370/95.3
[58] Field of Search ............... 370/60, 92, 94.1, 94.3, 370/95.1, 95.3, 104.1, 68.1; 455/13.1, 33.1, 33.2; 379/60

[56] References Cited

U.S. PATENT DOCUMENTS

| | | | |
|---|---|---|---|
| 4,090,036 | 5/1978 | Stott et al. | 370/104.1 |
| 4,317,197 | 2/1982 | Ulug | 370/94.1 |
| 4,625,308 | 11/1986 | Kim et al. | 370/104.1 |
| 4,775,974 | 10/1988 | Kobayashi | 370/104.1 |
| 4,920,529 | 4/1990 | Sasaki et al. | 370/60 |
| 4,926,422 | 5/1990 | Alaria et al. | 370/97 |
| 5,003,534 | 3/1991 | Gerhardt et al. | 370/94.1 |
| 5,081,704 | 1/1992 | Umeda et al. | 370/95.3 |
| 5,138,613 | 8/1992 | Kudoh | 370/60 |
| 5,179,550 | 1/1993 | Simpson | 370/60 |

*Primary Examiner*—Benedict V. Safourek
*Attorney, Agent, or Firm*—Robert M. Handy; Frederick M. Fliegel

[57] ABSTRACT

A communications network includes satellites, which serve as switching nodes and move in orbits about the earth. The network additionally includes stationary switching offices. Mobile communication units communicate with the network through the satellites using TDMA data packets and network control messages. The switching offices couple to PSTNs. Each mobile unit is managed by a nearby switching office that assigns a logical channel identification (LCID) value to the unit. The unit and network use the LCID value to identify the unit in network communications so that network resources are conserved. The network insures that LCID values assigned to opposing parties in a call are included in all TDMA data packets transported to the opposing parties. Satellites and switching offices use these LCID values as logical channel assignments which do not change throughout the duration of the call, in spite of movement by satellites.

18 Claims, 15 Drawing Sheets

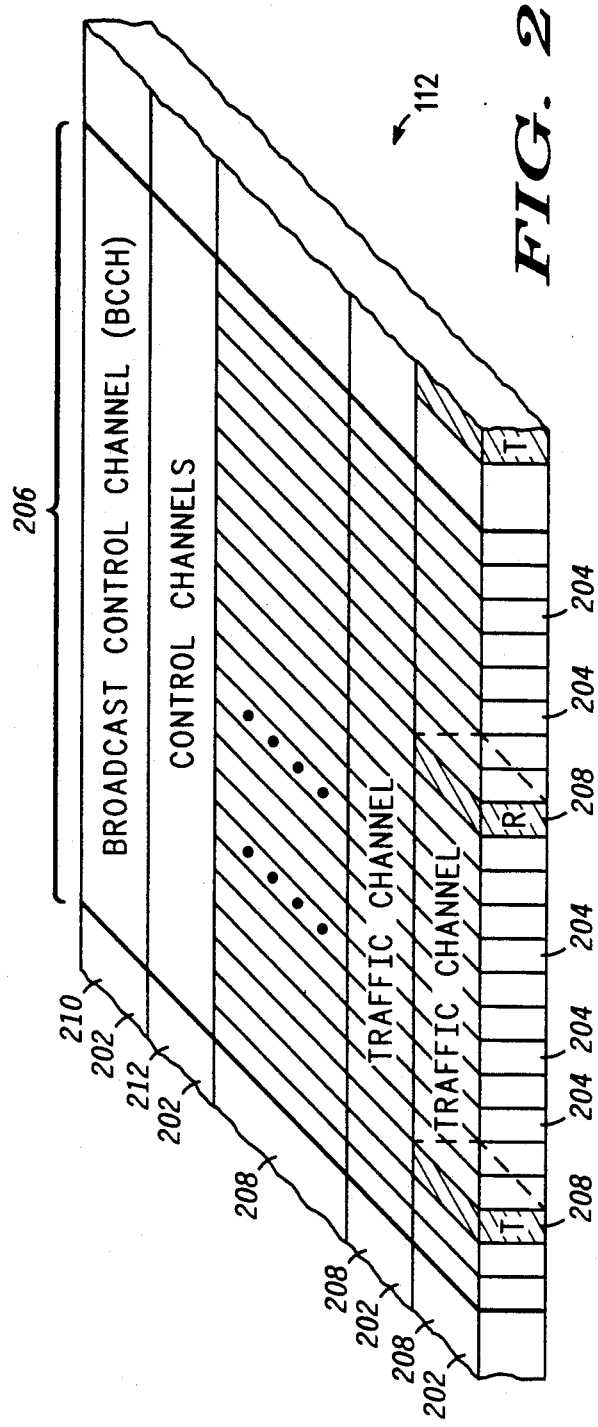
FIG. 2
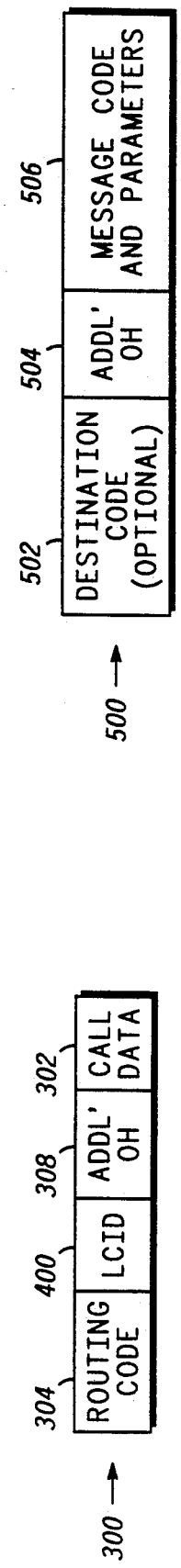
FIG. 5
FIG. 4
FIG. 3

NETWORK CONTROL MESSAGES 500

| | MU | SO | OMU | OSAO | DSO | DMU | MINIMUM DATA ELEMENTS |
|---|---|---|---|---|---|---|---|
| 902 LOG-ON | O | O | | | | | MU ID, LOCATION, AUTHENTICATION CODE |
| 904 LOG-ON-RESPONSE | O | O | | | | | MU ID, LCID, VALID |
| 906 INCOMING-CALL | | | | | O | R | LCID |
| 912 KILL-CALL | | | O,R | O,R | O,R | O,R | LCID |
| 908 OFF-HOOK | | | | R | R,O | O | DEST. LCID, (ORIG. LCID FROM DSO, DMU) |
| 910 CALL-CONNECTED | | | R | O | O | R | LCID, OPPOSING LCID, ROUTING CODE (TRAFFIC CHANNEL PARAMETERS FROM SV) |
| 914 OUTGOING-CALL | | | O | R | | | LCID, DEST. ID |
| 916 LOG-OFF | O | R | | | | | LCID |
| 918 RING | | | | O | R | | ORIG. LCID, DEST. ID OR LCID |

LEGEND

MU = MOBILE UNIT
OMU = ORIGINATING MOBILE UNIT
DMU = DESTINATION MOBILE UNIT

SO = SWITCHING OFFICE
OSO = ORIGINATING SWITCHING OFFICE
DSO = DESTINATION SWITCHING OFFICE
O = ORIGINATION OF MESSAGE
R = RECEIVER OF MESSAGE

FIG. 9

CALL PROCESSING USING LOGICAL CHANNEL ASSIGNMENTS

TECHNICAL FIELD OF THE INVENTION

The present invention relates generally to communications networks and to devices which communicate with such networks.

BACKGROUND OF THE INVENTION

A communications network supplies a communication path between two or more end users. The network typically has the capacity to connect only a finite amount of communication traffic at any given instant. Each call consumes some portion of the total available communication resources. Moreover, the network must dedicate some of its resources to the management of the network. This management includes, for example, the setting up of calls, the defining of communication paths, and the communication of billing data within the network. The minimization of resources dedicated to managing the network is desirable so that more resources become available for providing communication services to paying subscribers of the network.

A network may be viewed as having a number of switching nodes. Each switching node receives communications from several input ports and distributes these communications among several output ports. The end parties to a call communicate directly with their respective nodes. In some cases, the calling and called parties utilize the same network node. However, in other cases communication paths are established between diverse nodes, perhaps through intermediary nodes.

When a communications network is configured so that the switching nodes and the end users are stationary, the network resources dedicated to managing the network are relatively minor. Network resources need not be consumed to locate end users because end users do not move. Once a communication path has been established between network nodes, the path need not change because the nodes and end users do not move. However, when the network accommodates mobile end users, the need to conserve network resources increases. When mobile end users are involved, RF links are typically used to communicate with the end users. These RF links represent scarce resources which must be conserved to the maximum extent possible. Since the end users are mobile, the locations of called parties cannot be determined simply by examining data describing the called parties' identities. Hence, additional network resources must be consumed and additional intelligence must be designed into the network to determine how to service a "roaming" subscriber whose location varies.

The conservation of network resources becomes especially difficult in a network where at least some of the switching nodes of the network are mobile themselves. This situation occurs when satellites in moving orbits are used as network switching nodes. In this situation, the selection of particular network switching nodes to use in establishing communication paths depends upon which satellites are in convenient locations at the instant a communication is delivered. Moreover, the communication path definitions change from instant to instant as the satellites travel in their orbits. This instant-to-instant change can simultaneously affect thousands or even millions of communication paths through the network. The network resources needed to coordinate the instant-to-instant changes for a multitude of communication paths can potentially be great enough to make operation of the network impractical.

Increased intelligence could be designed into mobile switching nodes (satellites) to compensate for instant-to-instant communication path changes. However, more simple satellite designs are highly desirable to reduce network costs. In addition, simple satellite designs provide the most cost-effective network reliability because the repair of orbiting satellites is prohibitively expensive. Due to a desire to keep satellite designs simple, the complex intelligence which manages the network is preferably located, as much as practical, in nodes of the network which are not mobile.

SUMMARY OF THE INVENTION

Accordingly, it is an advantage of the present invention that an improved method of identifying communication channels within a communication network is provided.

Another advantage of the present invention is that communications within a communication network include a logical channel identification (LCID) value.

Yet another advantage is that the present invention configures LCID values so that a minimal amount of network resources are required in their communication.

Another advantage is that the present invention utilizes LCID values to minimize processing requirements at switching nodes of the network.

Another advantage is that the present invention provides a method of operating a network and units which communicate with the network so that a single LCID value serves the dual roles of identification and routing.

The above and other advantages of the present invention are carried out in one form by a method of operating a communication unit to facilitate calls between the communication unit and other units accessible through a communications network. The method calls for receiving a network control message from the network. This message conveys a logical channel identification (LCID) value for use in transmitting data during a call. Call data is obtained for transmission through the network during the call. A call data communication is then sent to the network. This call data communication includes the LCID value and the call data.

The above and other advantages of the present invention are carried out in another form by a method of operating a switching node of a communications network. The network has a plurality of similar switching nodes, and the network communicates TDMA data packets with a communication unit. The method calls for setting up a call through the network with the communication unit. A logical channel identification (LCID) value is obtained. The LCID value is stored so that an association is formed between the LCID value and data related to the call. The switching node then causes the LCID value to be included with data packets sent to the communication unit. The network uses the LCID value in routing the data packets to the communication unit.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a block diagram of a communication protocol used by a preferred embodiment of the present invention in establishing individual communication links between mobile switching nodes and mobile communication units;

FIGS. 3-5 show block diagrams of data formats used by the preferred embodiment of the present invention in transporting communications through the environment illustrated in FIG. 1;

FIG. 9 shows a table of messages sent between various entities included in the environment illustrated in FIG. 1;

The description presented below and the Figures are linked together through the use of reference numbers. These reference numbers are chosen to reflect the number of the Figure in which the referenced items may be best observed. In particular, the most significant digit of all three-digit reference numbers and the most significant two digits of all four-digit reference numbers equal the number of a Figure in which that referenced feature may be viewed.

DETAILED DESCRIPTION OF THE PREFERRED EMBODIMENTS

Figure 1:
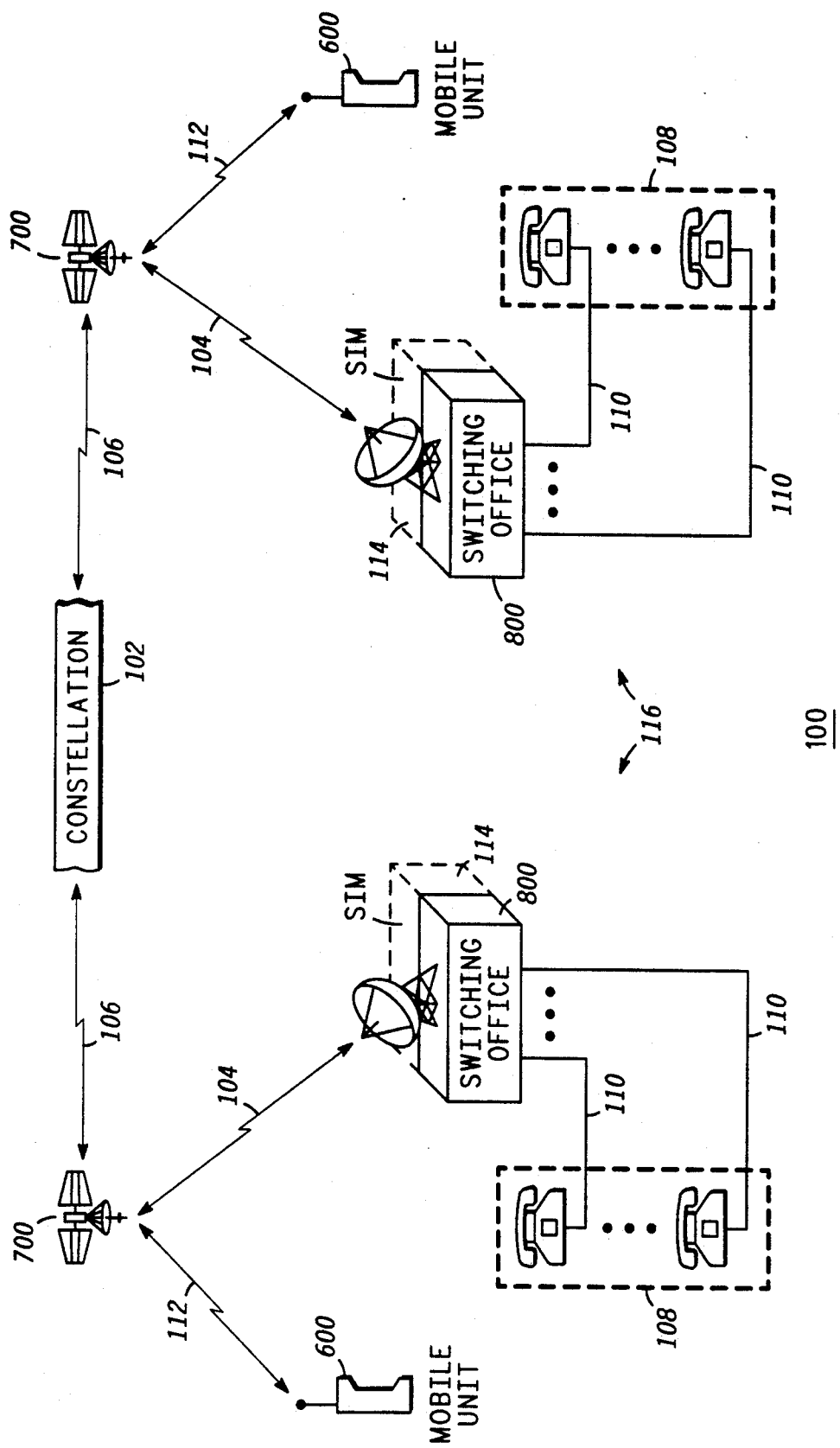
FIG. 1 shows a layout diagram of the environment within which the present invention is practiced.

FIG. 1 shows a layout diagram of an environment 100 configured in accordance with a preferred embodiment of the present invention. Environment 100 includes a constellation 102 of satellites 700. FIG. 1 specifically shows only two satellites, but constellation 102 may include any number of satellites 700. In a preferred embodiment of the present invention, 77 of satellites 700 are placed in a relatively low orbit around the earth (not shown). With such a constellation 102, direct line-of-sight communications may take place from any point on the surface of the earth to at least one of satellites 700. Due to the low earth orbits, constellation 102 and satellites 700 constantly move with respect to the earth. If, for example, satellites 700 are placed in orbits that are around 765 km above the earth, then an overhead satellite 700 travels at a speed of around 25,000 km/hr with respect to a point on the surface of the earth. This allows a satellite 700 to be within view of a point on the surface of the earth for a maximum period of around nine minutes.

Environment 100 additionally includes one or more switching offices (SOs) 800. SOs 800 reside on the surface of the earth and are in data communication with nearby ones of satellites 700 through RF trunking communication links 104. Satellites 700 are also in data communication with one another through trunking links 106. Hence, through constellation 102 of satellites 700, a SO 800 may control communications delivered to any point on the earth. SOs 800 couple to public switched telecommunication networks (PSTNs) 108 via any number of PSTN lines 110, from which calls directed toward subscribers of environment 100 may be received and to which calls placed by subscribers of environment 100 may be sent. Those skilled in the art will appreciate that a vast infrastructure of communication units, such as telephone instruments, facsimile machines, modems, and the like, can selectively couple to a SO 800 through a PSTN 108.

Environment 100 also includes any number, potentially in the millions, of mobile communication units (MUs) 600. MUs 600 may be configured as conventional portable radio communication equipment. In the preferred embodiment of the present invention, environment 100 accommodates the movement of MUs 600 anywhere within the confines of the earth below constellation 102. However, nothing requires MUs 600 to move, and environment 100 operates satisfactorily if a portion of the entire population of MUs 600 remains stationary. MUs 600 are configured to receive communications from overhead satellites 700 and to perform other functions which are discussed below. MUs 600 communicate with nearby satellites 700 through individual communication links 112.

Any number of subscriber information managers (SIMs) 114 are also included within environment 100. Each SIM 114 maintains a subscriber database that is relevant to only a discrete portion of the population of MUs 600. In the preferred embodiment, one SIM 114 is associated with each SO 800. In fact, a SIM 114 and a SO 800 may desirably use the same computerized hardware. In such an embodiment, a SIM 114 and a SO 800 are separated logically rather than physically. Each SO 800 may communicate with any SIM 114 through constellation 102, PSTNs 108, or internal computer structures when a SO 800 communicates with its logical partner SIM 114.

In general terms, environment 100 may be viewed as including a network 116 through which MUs 600 communicate. Network 116 is formed from constellation 102 of satellites 700, SOs 800, and SIMs 114, and any other entity (not shown) useful to the provision of communication services. Each of satellites 700 and SOs 800 represents a switching node of network 116. Calls may be set up between an originating MU (OMU) and a destination MU (DMU), calls may be set up, for example, between an OMU and a destination PSTN phone number or between a PSTN phone number and a DMU. Generally speaking, each MU 600 engages in control communications with a nearby SO 800 through constellation 102. These control communications take place before forming a communication path between a MU 600 and another unit. In particular, a MU 600 communicates with a nearby SO 800. This SO 800 may be considered the serving SO for that particular MU 600. When the MU 600 is acting as an OMU, the corresponding SO 800 may act as an origination SO (OSO). When the MU 600 is acting as a DMU, then the corresponding SO 800 acts as a destination SO (DSO).

FIG. 2 shows a block diagram of a communication protocol used by a preferred embodiment of the present invention in establishing individual communication links 112. Satellites 700 communicate over individual links 112 using any number, potentially in the thousands, of frequency channels 202. Thus, satellites 700 and MUs 600 may desirably employ a frequency division multiple access (FDMA) scheme so that numerous independent communication links may be established simultaneously.

On top of this FDMA scheme, a time division multiple access (TDMA) scheme may be employed in traffic channels 208, which make up a majority of frequency channels 202. Via this TDMA scheme, a number of independent individual traffic channels 208 share a common frequency assignment. Interference between channels 208 is prevented by assigning diverse channels 208 to diverse time slots 204. The TDMA scheme repeats a given time slot 204 once every frame 206. In the preferred embodiment, each frame 206 is around 60 msec. long. Those skilled in the art will appreciate that the number of traffic channels, frequency channels, and the duration of frames are chosen somewhat arbitrarily and may be varied from application to application.

Two of time slots 204 within each frame 206 may desirably be dedicated to each traffic channel 208. Thus, traffic channels 208 are duplex channels with one time slot 204 dedicated to transmitting data and one time slot 204 dedicated to receiving data. In the preferred embodiment of the present invention, communications data are collected, digitized, and compressed, throughout the duration of a frame 206. Such data are then transmitted through a traffic channel 208 at a high data rate for a short burst during a single time slot 204. Conversely, data received in a single burst during a time slot are expanded, and may be converted into an analog form throughout the duration of a subsequent frame 206. Accordingly, traffic channels 208 represent digital, real time communication links.

As further illustrated in FIG. 2, a portion of frequency channels 202, and preferably a small portion, may be dedicated to performing network management. Generally speaking, network management channels are configured to efficiently communicate a large volume of short network control messages within each frame 206. In particular, a broadcast control channel (BCCH) 210 may be used exclusively to transmit network control messages from a satellite 700 to any MU 600 which may be listening to BCCH 210. Likewise, one or more control channels 212 may be dedicated to allowing MUs 600 to transmit control messages to an overhead satellite 700. Such control messages may desirably be transmitted from MUs 600 in accordance with conventional multiple carrier access techniques, such as CSMA/CD for example. Of course, nothing prevents control channels 210-212 from incorporating any other communication technique which suits the implementation of any particular network 116.

For any single satellite 700, trunk links 104-106 preferably have significantly greater capacity than individual links 112. Links 104-106 may be configured in any suitable format known to those skilled in the art, and links 104-106 need not possess the same frequency or timing parameters as links 112. Thus, satellites 700 may re-package messages received from one communication link into a format compatible with another link before passing the messages on.

FIGS. 3-5 show block diagrams of exemplary data formats used in transporting communications within environment 100. FIG. 3 illustrates an exemplary TDMA data packet 300 utilized in connection with traffic channels 208 of links 112 and in trunk links 104 and 106. Packet 300 fits within a time slot 204 and conveys call data 302. Accordingly, a continuous stream of call data is divided into packets 300 via the TDMA transmission scheme discussed above. A primary purpose of environment 100 is to convey call data 302. Other data represents network management data which are used to manage environment 100 so that it can convey call data 302.

In addition, packet 300 conveys a routing code 304, a logical channel identification (LCID) value 400, and additional overhead data 308. Routing code 304 allows constellation 102 to transport packet 300 to its intended destination. LCID value 400 generally serves as an identifier for the communication unit or SO 800 to which packet 300 is directed. Additional overhead data 308 represents any additional data, such as error detection/correction codes, codes used to distinguish call data 302 from other types of data, and the like, which are useful in transmitting data within network 116 and are known to those skilled in the art. Preferably, the length of additional overhead data 308 is held to a minimum.

FIG. 4 shows a preferred format suitable for LCID value 400. LCID value 400 preferably includes a SO ID component 402 and a sequence number 404. LCID values 400 are assigned by SOs 800 in accordance with procedures discussed below. SO ID 402 carries a value which uniquely identifies the particular SO 800 that assigned or originated LCID value 400. Each SO 800 utilizes its own ID in generating SO ID value 402. Sequence number 404 is a value which distinguishes all LCID values 400 generated by a SO 800 from one another. In other words, no SO 800 assigns the same sequence number 404 to different LCID values 400. Accordingly, all LCID values 400 existing within environment 100 are unique. In the preferred embodiment, LCID value 400 may be conveyed using around 24 bits of data. As will be discussed in more detail below, LCID value 400 is used to identify MUs 600, to identify SOs 800, to route data packets 300 to their intended locations, and to separate call data 302 from numerous diverse packets 300 into individual call data streams. Those skilled in the art will appreciate that nothing prevents components 402 and 404 from being further subdivided. For example, SO ID 402 may be further divided so that one or more bits of SO ID 402 indicates a particular type of SO 800 if environment 100 includes different types of SOs 800.

FIG. 5 shows an exemplary data format suitable for a network control message (NCM) 500. Generally speaking, messages 500 are sent between devices or entities within environment 100 to control the operation of network 116. For example, messages 500 are utilized to register and deactivate MUs 600 with network 116, to setup calls within network 116, to deactivate calls within network 116, and the like. Moreover, messages 500 generally carry less data than packets 300 so that a large number of messages 500 may be conveyed using the smallest possible amount of network resources. With reference to links 112, as shown in FIG. 2, messages 500 are generally transported over control channels 210-212, but nothing prevents them from being inserted with call data and transported over a traffic channel 208. Packets 300 are communicated exclusively over traffic channels 208. Trunk links 104 and 106 may intermingle packets 300 and messages 500 using any useful format.

As shown in FIG. 5, network control message 500 includes a destination ID 502 to allow message 500 to be delivered to its intended destination. Message 500 may include additional overhead data 504, which is preferably minimized to conserve network resources. In addition, message 500 carries a message code that distinguishes the message from other messages and carries message parameters 506.

Figure 6:
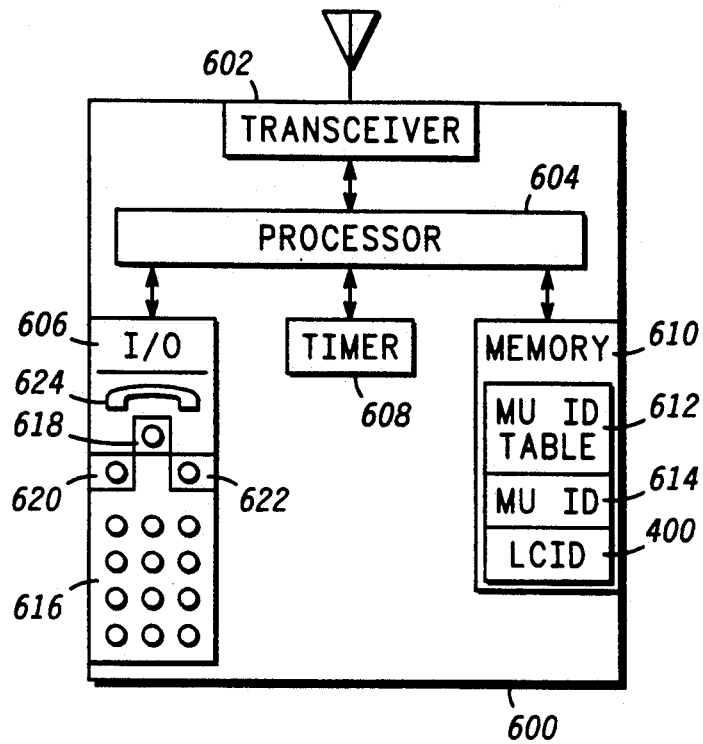
FIGS. 6, 7, and 8 show block diagrams of a mobile communication unit, a moving switching node, and a switching office, respectively.

FIG. 6 shows a block diagram of a mobile communication unit (MU) 600. MU 600 includes a transceiver 602 that transmits and receives signals in a format compatible with satellites 700 and network 116. These signals allow MU 600 to be in data communication with a nearby satellite 700. Through this satellite 700, MU 600 is also in data communication with any other node of network 116, such as a nearby SO 800. Transceiver 602 couples to a processor 604. Processor 604 additionally couples to an input/output (I/O) section 606, a timer 608, and a memory 610. Processor 604 uses timer 608 to maintain the current date and time and to support the TDMA transmission scheme discussed above in connection with FIGS. 2-5. Memory 610 includes data which serve as instructions to processor 604 and which, when executed by processor 604, cause MU 600 to carry out procedures that are discussed below.

In addition, memory 610 includes variables, tables, and databases that are manipulated due to the operation of MU 600. One of these tables is a MU ID table 612, which permanently holds a MU identification (ID) value 614. MU ID value 614 uniquely identifies MU 600 within the population of MUs 600. In addition, MU ID value 614 includes a field (not shown) that identifies the home SIM 114 which holds data describing MU 600, the features associated with MU 600, and the subscriber who owns MU 600. Relative to an LCID value 400, MU ID 614 is a large data item which may be described in up to 240 bits of data or more. Table 612 additionally records an LCID value 400.

I/O section 606 of MU 600 is used to collect inputs from a user of MU 600 and to provide outputs for the user to perceive. Section 606 includes, for example, a keypad 616, which is used to collect numbers that identify a party to whom a call may be directed. A power switch 618 controls the energization and de-energization of MU 600. A send key 620 is used to indicate when a called party's number has been entered, and a hook switch 622 is used in a conventional sense. A multitone, or handset in a conventional sense, 624 transforms audible signals into electrical signals, and vice-versa. Although not specifically illustrated, I/O section 606 may additionally include A/D, D/A, and other circuits conventionally utilized in converting between analog and digital representations of signals.

Figure 7:
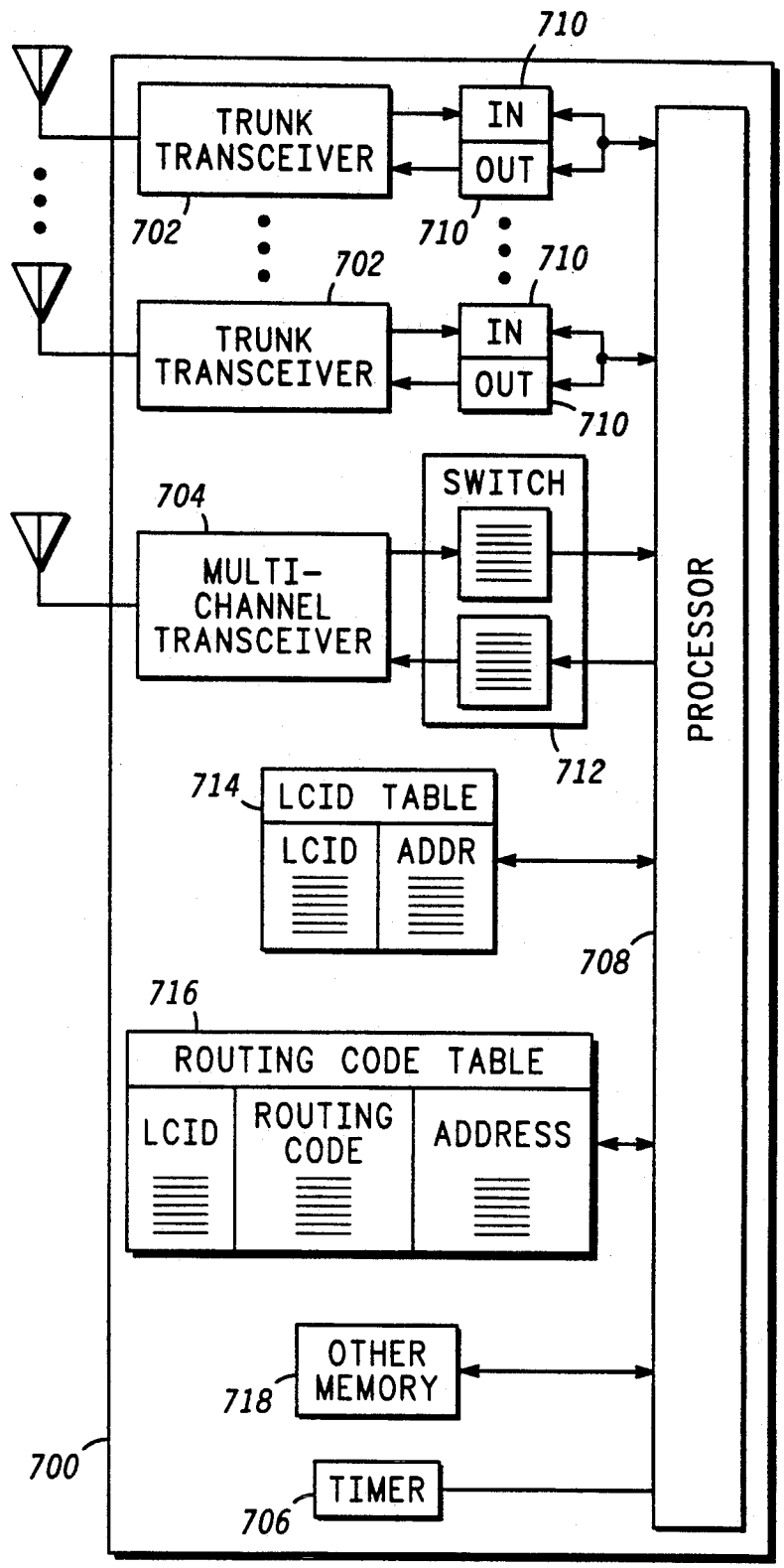

FIG. 7 shows a block diagram of a satellite 700. Satellite 700 includes a plurality of trunk transceivers 702 and a multichannel transceiver 704. One transceiver 702 serves one trunk link 104 or 106. Any number of transceivers 702 may be included. Transceiver 704 serves all of a satellite's individual links 112. Transceivers 702 and 704, along with numerous memory components and a timer 706 couple to a processor 708. The memory components include input and output buffers 710 for trunk links 104-106. In addition, the memory components include a cross-connect switch 712 for operation of transceiver 704. Those skilled in the art will appreciate that a logical rather than a physical link may exist between memories 710 and 712 and their respective transceivers if processor 708 actually performs data transfers.

The memory components include an LCID table 714. Table 714 associates LCID values 400 with addresses in a one to one correspondence. The addresses included in table 714 represent locations in an output buffer of switch 712. These addresses directly correspond to the transmit portion of a traffic channel 208. In other words, by writing data in the output buffer of switch 712 at the location specified by an address in LCID table 714, a particular traffic channel is selected. Transceiver 704 then causes the written data to be transmitted over the frequency and in the time slot that corresponds to that particular traffic channel 208.

In addition, the memory components include a routing code table 716. Table 716 associates LCID values 400 with message routing codes 304 and addresses in a one to one correspondence. The addresses included in table 716 directly correspond to the receive portion of a traffic channel 208. In other words, by reading data from the input buffer of switch 712 at the location specified by an address in routing code table 716, a particular traffic channel is selected. Satellite 700 may then append a routing code 304 and LCID value 400 to such data from the input buffer of switch 712 prior to transmission within network 116. In general, the LCID values 400 included in routing code table 716 are not the same LCID values 400 included in LCID table 714. The LCID values 400 stored in tables 714-716 serve different ends of a call.

The memory components also include other memory 718. Memory 718 includes data which serve as instructions to processor 708 and which, when executed by processor 708, cause satellite 700 to carry out procedures that are discussed below. Memory 718 also includes other variables, tables, and databases that are manipulated due to the operation of satellite 700.

Figure 8:
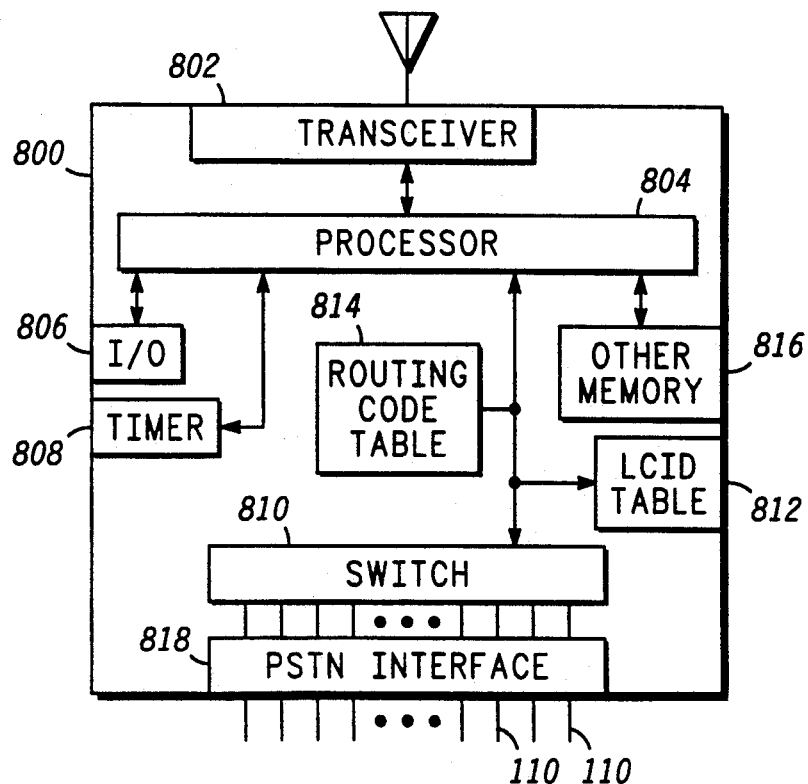

FIG. 8 shows a block diagram of a SO 800. SO 800 includes a transceiver 802 which transmits and receives signals in a format compatible with trunk links 104. These signals allow SO 800 to communicate with a nearby satellite 700, with MUs 600 that the SO 800 is currently serving, with other SOs 800 that the SO 800 may be cooperating with in setting up and processing a call, and with any SIM 114 within network 116. Transceiver 802 couples to a processor 804. Processor 804 also couples to an I/O section 806, a timer 808, and various memory components. The memory components include a cross connect switch 810, an LCID table 812, a routing code table 814, and other memory 816. Switch 810 couples, either physically, as shown, or logically (not shown) through processor 804, to a PSTN interface 818. Switch 810, LCID table 812, and routing code table 814 operate in an analogous manner to switch 712, LCID table 714, and routing code table 716 of satellite 700. However, tables 812-814 and switch 810 allow SO 800 to select or identify a particular PSTN line 110 rather than a traffic channel 208.

I/O section 806 receives input from keyboards and other input devices and provides data to display terminals, printers, and other output devices. Processor 804 uses timer 808 to maintain the current date and time and to support timing requirements of trunk link 104. Other memory 816 includes semiconductor, magnetic, and other storage devices for storing data that serve as instructions to processor 804 and which, when executed by processor 804, cause SO 800 to carry out procedures that are discussed below. In addition, memory 816 includes other variables, tables, and databases that are manipulated due to the operation of SO 800. Through interface 818, SO 800 communicates with the PSTN 108. Interface 818 includes A/D converters, D/A converters, amplifiers, and other circuits which are known to those skilled in the art and are useful in converting digital data into signals compatible with the requirements of a PSTN 108.

In the preferred embodiment, the block diagram of FIG. 8 also applies to SIMs 114. Processor 804, I/O section 806, timer 808, and memory 816 may serve the dual role of SO 800 and SIM 114. Those skilled in the art will appreciate that the difference between SIM 114 and SO 800 will be established through programming instructions stored in memory 816. Accordingly, the diverse logical entities of SO 800 and SIM 114 may be performed on the same physical hardware.

FIG. 9 shows a table of network control messages 500 sent between the various entities of environment 100. The table of FIG. 9 includes columns for message names, data conveyed by particular messages, and entities such as MUs 600 and SOs 800 that play a role in connection with the messages. While the table of FIG. 9 shows certain data items as being communicated by various messages, those skilled in the art will understand that other system concerns may make the communication of additional messages and additional information in the messages desirable. Hence, the data items are to be viewed as a minimum set of data elements to be included in the messages.

The table of FIG. 9 includes separate columns for MU, OMU, and DMU to distinguish the various roles a MU 600 may play in connection with processing a call. The MU column is relevant to messages which are not related to a particular call, the OMU column is relevant when a MU 600 is originating a particular call, and the DMU column is relevant when a MU 600 is the destination of a particular call. Likewise, SO, OSO, and DSO columns are provided to distinguish the various roles that a SO 800 may play in connection with a call. The SO column is relevant to messages that are not related to a particular call, the OSO column is relevant when a SO 800 is playing a role near an originating end of a call, and the DSO column is relevant when a SO 800 is playing a role near a destination end of a call.

Figure 10:
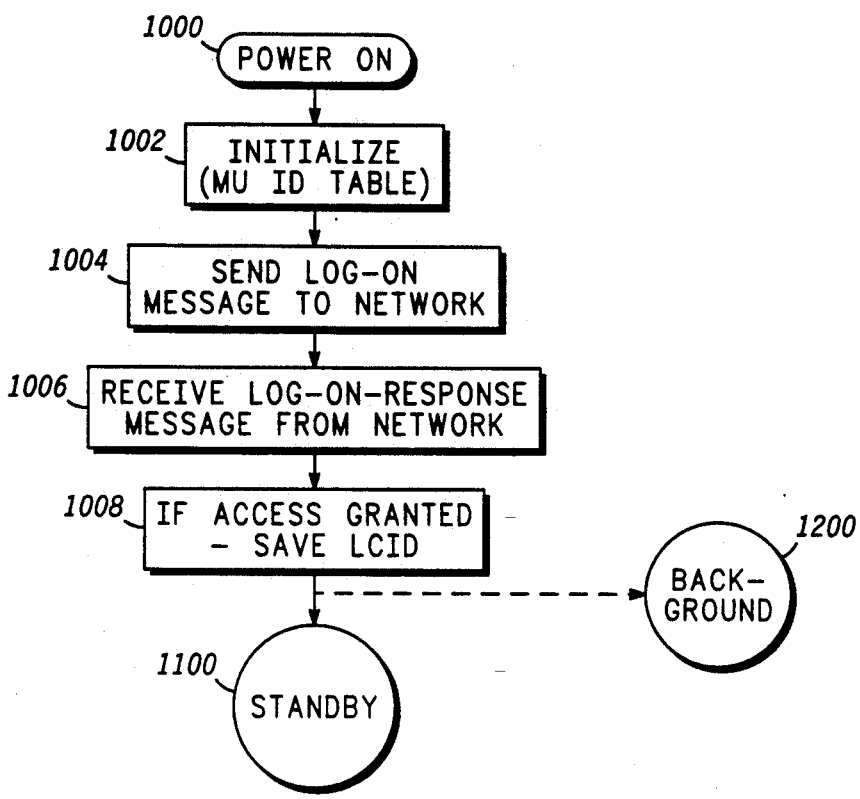
FIGS. 10-12 show flow charts of procedures performed by the mobile communication units to support call processing through the use of logical channel assignments.
Figure 11:
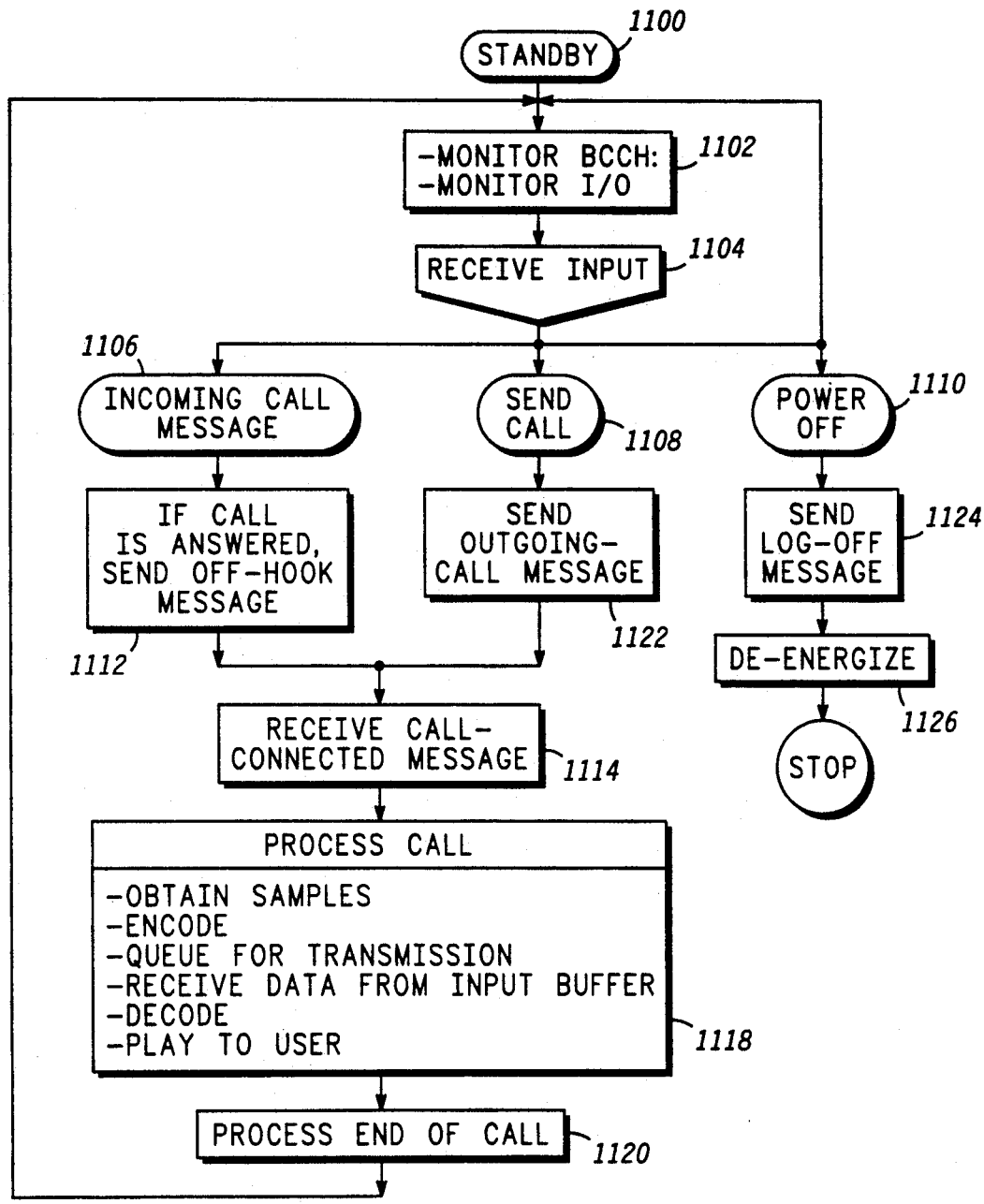
Figure 12:
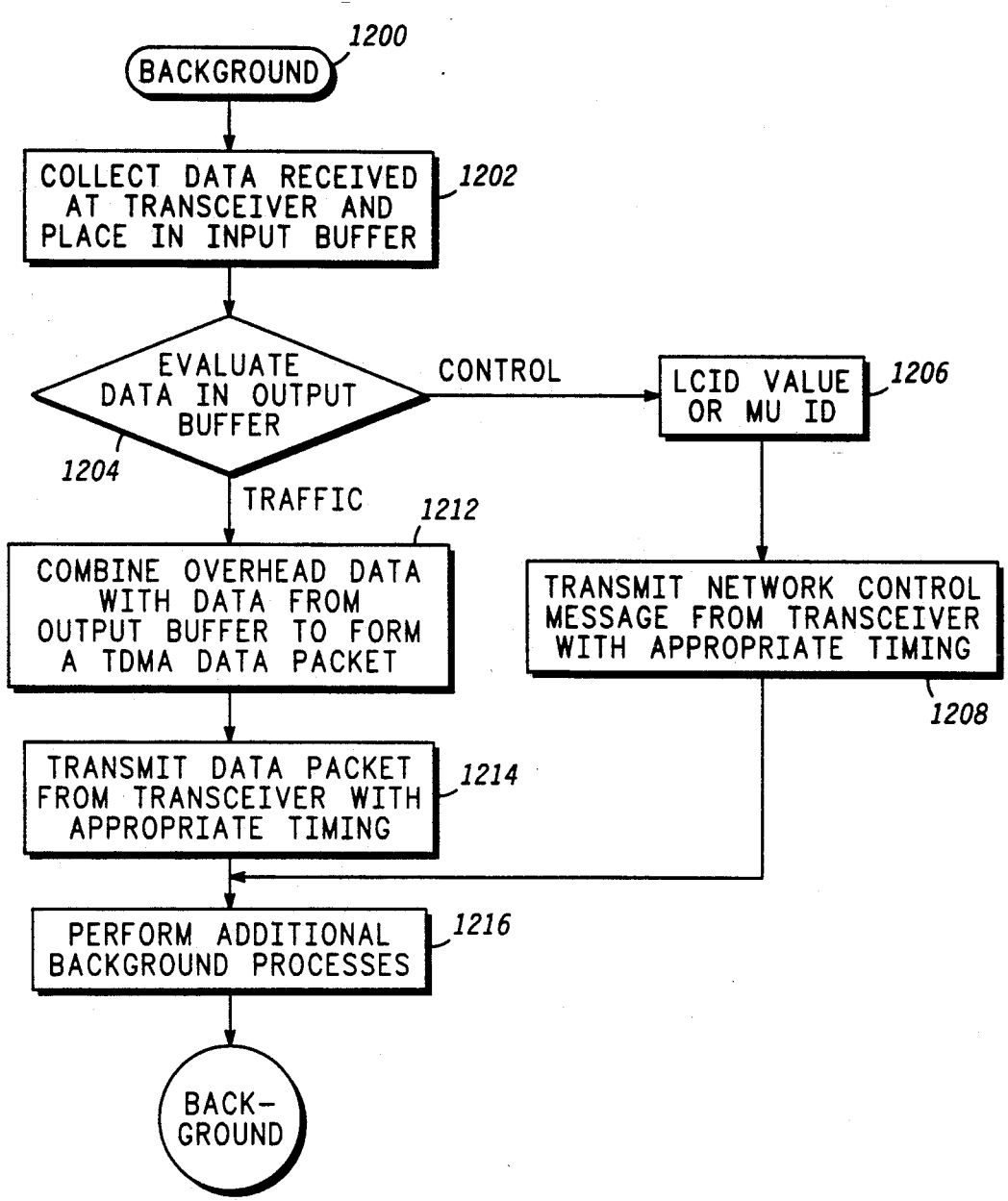
Figure 13:
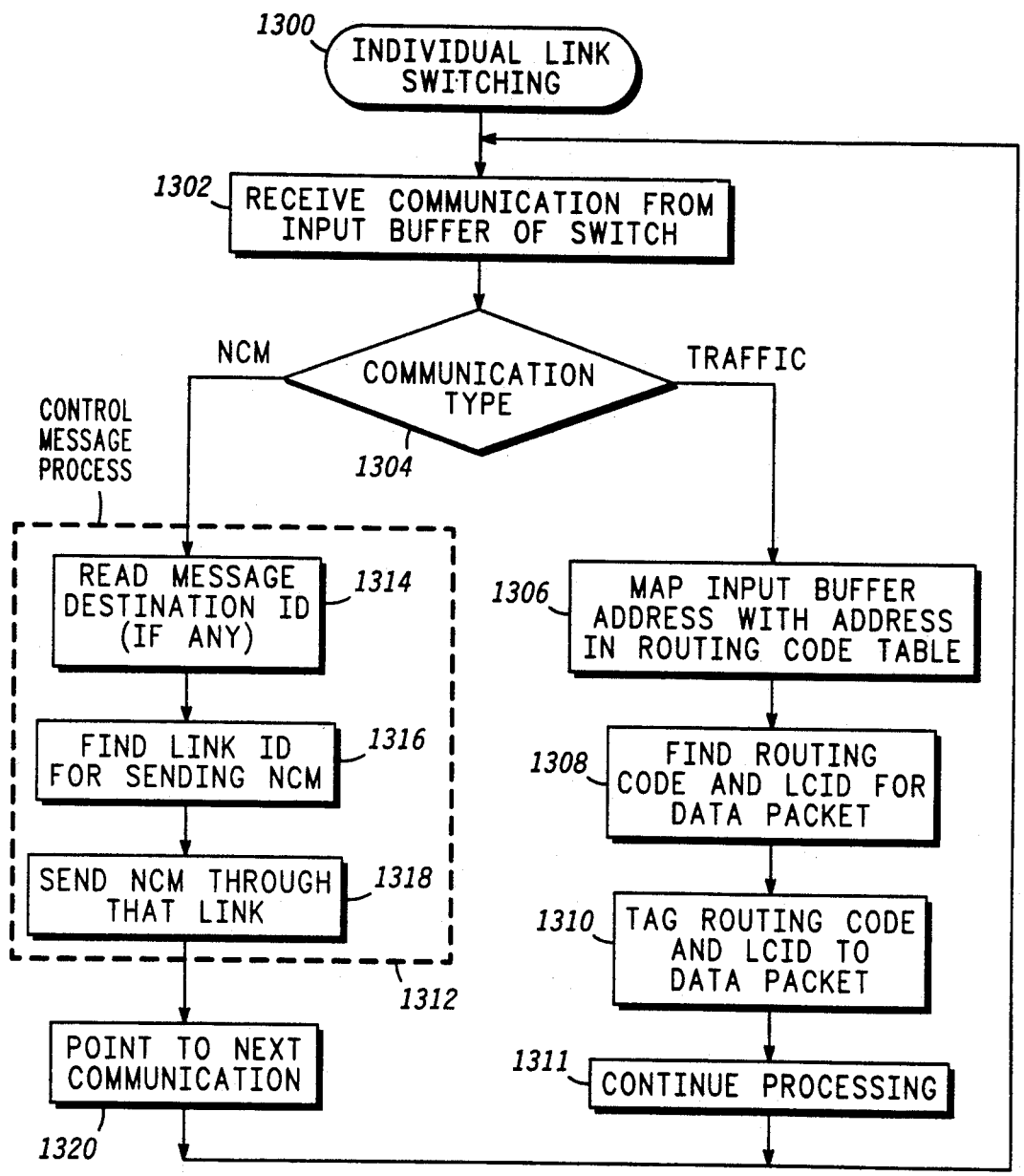
FIGS. 13-14 show flow charts of procedures performed by moving switching nodes to support call processing through the use of logical channel assignments.
Figure 14:
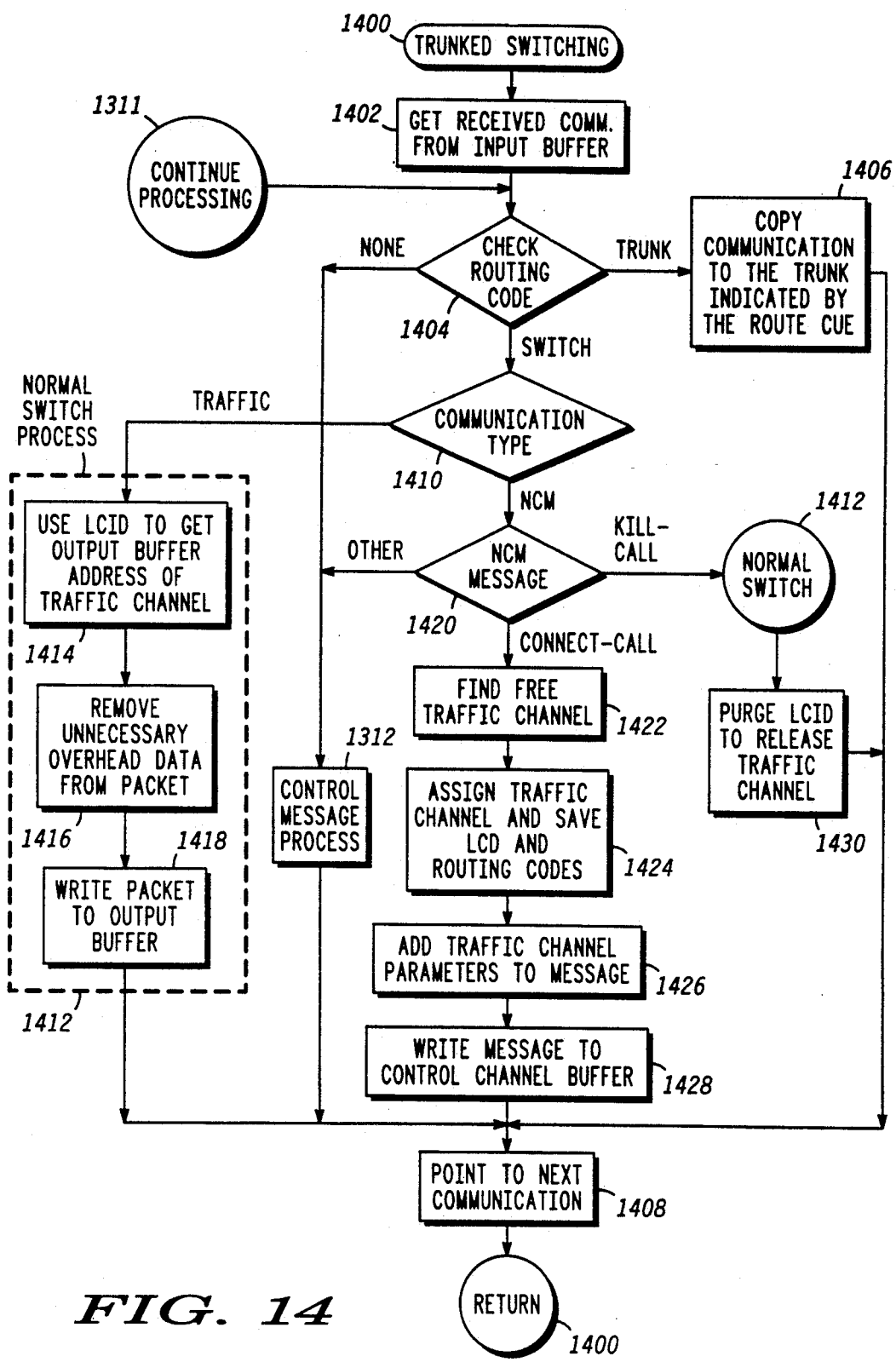

FIGS. 10–12 show flow charts of procedures performed by MUs 600 to support call processing through the use of logical channel assignments, FIGS. 13–14 show flow charts of a procedure performed by satellite 700 to support call processing through the use of logical channel assignments, and FIGS. 15–23 show flow charts of procedures performed by SOs 800 to support call processing through the use of logical channel assignments. Detailed discussions of the messages and data elements shown in FIG. 9 are presented below where appropriate in connection with the procedures shown in FIGS. 10–23. Those skilled in the art will appreciate that the procedures discussed below in connection with FIGS. 10–23 are controlled by programming instructions placed in memories 610, 718, and 816 of MUs 600, satellites 700, and SOs 800, respectively.

With respect to the procedures performed by MU 600 in support of call processing through the use of logical channel assignments, as shown in FIGS. 10–12, FIG. 10 shows a Power On procedure 1000 performed by a MU 600 upon energization. A task 1002 initializes its MU ID table 612. In particular, task 1002 refrains from altering MU ID value 614, but purges any values associated with LCID value 400.

After initialization, a task 1004 causes a Log-On network control message 902 (see FIG. 9) to be sent to a nearby SO 800. Log-On message 902 includes MU ID value 614 to uniquely identify the MU 600 sending message 902. Message 902 may carry other parameters, such as data describing the location of MU 600 and an encrypted authentication code which can be used in deciding whether to allow MU 600 to gain access to network 116.

Those skilled in the art will appreciate that the sending of any message, whether message 902 or otherwise, by any entity within environment 100, whether MU 600 or otherwise, may include waiting for the receipt of an appropriate acknowledgment message. If an acknowledgement is not received within a predetermined period of time, then the message may be repeated. Likewise, the receipt of any message may include the transmission of an appropriate acknowledgement message in response to the received message. Such details are appreciated by those skilled in the art and are not discussed further herein.

An overhead satellite 700 will route Log-On message 902 to a nearby SO 800. The particular SO 800 is chosen by satellite 700 as being the primary SO 800 served by that satellite 700 at the instant Log-On message 902 is received at satellite 700. Since MU 600 may move anywhere within the space covered by environment 100, any SO 800 may receive message 902. As will be discussed below, this SO 800 will process message 902 and return a Log-On-Response message 904 to MU 600.

MU 600 receives message 904 during a task 1006. MU 600 detects message 904 by monitoring BCCH 210 for a network control message 500 that is addressed to MU 600. A message 500 is considered to be addressed to MU 600 if it includes MU ID 614. Message 904 will inform MU 600 whether MU 600 has been granted access to network 116. If access is granted, message 904 will also convey an LCID value 400 as a parameter 506 of message 904. If message 904 informs MU 600 that access to network 116 has been granted, which is the normal situation, then a task 1008 saves the LCID value 400 from message 904 in MU ID table 612.

After task 1008, program control goes to a standby mode of operation, which is discussed below in connection with FIG. 11. In addition, MU 600 simultaneously performs a Background procedure 1200, which is discussed below in connection with FIG. 12. Background procedure 1200 is performed in a background mode by MU 600. In other words, procedure 1200 continuously operates even though other tasks not related to procedure 1200, such as those related to setting up and making calls, are being performed in generally the same time frame.

FIG. 11 shows a flow chart of Standby procedure 1100. As discussed above, procedure 1100 is performed after MU 600 has been logged on network 116. Generally speaking, in procedure 1100 MU 600 first waits for a call to be setup. In particular, at a task 1102, MU 600 monitors BCCH 210. BCCH 210 is used by network 116 to inform MU 600 of an incoming call. In addition, task 1102 monitors I/O section 606 of MU 600 to determine if the user of MU 600 is entering information which will lead to the sending of a call. In a preferred embodiment, a user may manipulate keypad 616 to enter a phone number or other identifying code, then press send button 620 to cause the phone number or code to be sent to network 116.

A switching task 1104 routes program control to an appropriate procedure when a call setup related activity occurs. If no call setup activity occurs, program control remains at task 1102. If an Incoming-Call message 906 is detected on BCCH 210, an Incoming-Call message procedure 1106 is performed. If a manipulation of I/O section 606 that instructs MU 600 to place a call is detected, a Send Call procedure 1108 is performed. And, if a manipulation of power switch 618 is detected, a Power Off procedure 1110 is performed. Those skilled in the art will appreciate that task 1104 may additionally recognize other stimulations not directly related to the present invention and route program control accordingly.

Incoming-Call message procedure 1106 is performed whenever MU 600 receives an Incoming-Call message 906. This message is received over BCCH 210. As discussed above, network control messages 500, including message 906, sent over BCCH 210 are generally directed toward a large number of different MUs 600. Any single MU 600 determines that a message is intended for it by monitoring BCCH 210 in task 1102 for a message which carries LCID value 400, saved above in table 612 during task 1008. Nothing requires a network control message 500 to identify a particular MU 600 through the use of only a LCID value 400. MU 600 may monitor BCCH 210 for network control messages that convey either LCID value 400 from table 612 or MU ID 614. However, those skilled in the art will appreciate that LCID value 400 may be considerably shorter than MU ID 614. Accordingly, resources of network 116 are conserved by using LCID value 400 compared to the use of MU ID 614 because less data needs to be communicated through network 116 to MU 600 in the sending of network control messages 500, such as message 906.

Message 906 simply conveys the fact that a call is being setup to MU 600. In other words, MU 600 is the called party in a call. When MU 600 receives message 906, it then acts as a destination MU or DMU 600 for the purposes of procedure 1106.

Procedure 1106 includes a task 1112, which waits until the call is answered then sends an Off-Hook message 908 to network 116. Of course, those skilled in the art will appreciate that MU 600 may operate a buzzer (not shown) to inform a user of the incoming call, and that hook switch 622 may be monitored to determine when the call is answered. In addition, nothing prevents MU 600 from sending an acknowledgement message to network 116 as soon as message 908 is received and before an off hook condition is detected so that network 116 may be informed that MU 600 has been found and is able to receive a call. Off-Hook message 908 includes the LCID value 400 saved in table 612 so that the SO 800 sending the Incoming-Call message will know which MU 600 is sending the message 908. In addition, this LCID value 400 informs a satellite 700 relaying message 908 to SO 800 of the identity of SO 800. In other words, this LCID value 400 identifies the one of several potential SOs 800 to which a satellite 700 should route message 908. The use of LCID value 400 rather than MU ID 614 to identify MU 600 to SO 800 conserves network resources because it is shorter than MU ID 614. In spite of LCID value 400 being shorter than MU ID 614, it also conveys information that allows satellite 700 to switch the network control message to the appropriate SO 800. MU ID 614 contains or suggests no such information.

After task 1112 sends Off-Hook message 908, a task 1114 waits until a Call-Connected message 910 is received. Generally speaking, message 910 informs MU 600 that a communication path has now been formed between the other party and MU 600. Message 910 is received through a control channel 210–212 and preferably uses LCID value 400 to identify the MU 600 to which message 910 is directed. In addition, message 910 conveys parameters that define a traffic channel 208 that MU 600 will use in communicating with the other party in the call. As discussed above, this traffic channel 208 is used only to communicate with an overhead satellite 700, and communications are then repackaged for transmission over trunk links 104–106. These traffic channel parameters are used in task 1114 to program transceiver 602 so that communication over the specified traffic channel 208 may take place.

After adjusting transceiver 602, process 1106 performs a process call task 1118. Task 1118 performs several sub-tasks that may be considered conventional in the art of telephony and digital communications. For example, samples of an audio signal received at handset 624 are taken and encoded or otherwise compressed. The compressed samples are then placed in a queue for transmission to network 116. This transmission will take place through the operation of Background procedure 1200, discussed below. Likewise, call data received from network 116 are obtained from an input buffer and decoded or decompressed, converted to an analog form, then played to the user at handset 624. The received data are also handled through Background procedure 1200. While processing the call data, MU 600 may monitor the data for the occurrence of a network control message. For example, another Call-Connected message 910 may instruct MU 600 to switch to a different traffic channel. In addition, a Kill-Call message 912 may inform MU 600 that the call has been terminated and that the previously used communication path through network 116 is disappearing. MU 600 may desirably monitor hook switch 622 to determine if the user is terminating the call.

When the call is terminated, a task 1120 is performed to process the end of the call. For example, if the user of MU 600 terminates the call, then a Kill-Call message 912 may be sent to network 116. After task 1120, program control returns to task 1102 of Standby procedure 1100, discussed above.

With reference back to Send Call procedure 1108, procedure 1108 is performed when a user has instructed MU 600 to originate a call to another unit in environment 100. When MU 600 receives instructions to originate a call, it acts as an origination MU, or OMU 600 for the purposes of procedure 1108. Procedure 1108 performs a task 1122 to send an Outgoing-Call message 914 to the SO 800 serving MU 600. The SO 800 serving OMU 600 controls the origination end of the call being setup. Outgoing-Call message 914 conveys the identity of OMU 600 by including LCID value 400 in message 914. MU ID 614 is omitted to conserve network resources. Message 914 informs SO 800 that OMU 600 wishes to setup a call and conveys a code that identifies the destination party. This code may be a phone number for a device coupled to PSTN 108 or another code, such as a MU ID, which identifies a DMU 600. As will be discussed below, this causes SO 800 to initiate network control communications related to setting up the requested call.

After task 1122, process 1108 performs substantially the same tasks as were discussed above in connection with tasks 1114–1120. After termination of the call, program control returns to standby procedure 1100.

With reference to Power Off procedure 1110, procedure 1110 is performed when a command to turn MU 600 off is detected from I/O section 606. Procedure 1110 performs a task 1124 to send a Log-Off message 916 to network 116. Message 916 carries the identity of the logging off MU 600 in the form of LCID value 400 from table 612. MU ID 614 is omitted. Message 916 informs network 116 that the MU 600 is powering down.

Network 116 uses Log-On and Log-Off messages 902 and 916, respectively, to keep track of whether a MU 600 is available to receive calls. By determining when a MU 600 is not available to receive calls because of being powered off, network 116 is able to block the setting up of calls to powered off MUs 600 at an early stage in the call setup process. This conserves network resources because the call setup process is prevented from progressing to near completion in such circumstances. In addition, after a MU 600 has logged off, the LCID value 400 which the MU 600 has been using is no longer needed by MU 600 and may be reused by another MU. Accordingly, while an LCID value 400 may be unique within network 116 at any given instant, it need not be uniquely dedicated to any particular MU 600 or call over time. In other words, the same LCID value that MU 600 has been using may be reassigned to another MU 600 after MU 600 logs off. After task 1124, a task 1126 de-energizes MU 600. When MU 600 is again powered up, it will begin performing Power On procedure 1000, discussed above. It will then receive another LCID value 400 for storage in table 612. This second LCID value 400 need not, and generally will not, equal the first LCID value 400.

FIG. 12 shows a flow chart of tasks performed by MU 600 during Background procedure 1200. As discussed above, procedure 1200 operates continuously and handles the flow of data into and out from MU 600. Accordingly, procedure 1200 performs a task 1202 to collect data received at transceiver 602 and place this data in an appropriate input buffer of memory 610. Those skilled in the art will appreciate that error detection and correction processes may be performed as well. After task 1202, a query task 1204 evaluates the data in an output buffer of memory 610 to determine if the data represents a network control message 500 or call data obtained from handset 624 during task 1118.

When the output buffer contains a network control message, a task 1206 obtains LCID value 400 from table 612, if available, and combines it with the message. Generally speaking, LCID value 400 is not available for a Log-On message 902 but is available for other network control messages. When a Log-On message 902 is being sent, task 1206 combines MU ID 614 with the message. In addition, task 1206 may include overhead data which identify the network control message 500 as a network control message and distinguish it from a call data communication. A task 1208 causes transceiver 602 to transmit the network control message over an appropriate channel with appropriate timing so that an overhead satellite 700 may receive it. As discussed above, except for Log-On message 902, the network control messages use LCID value 400 from table 612 to identify MU 600, to identify a specific SO 800, and to conserve network resources.

When task 1204 determines that data in the output buffer represent call or traffic data, a task 1212 obtains overhead data that identify the call data as call data and distinguish them from a network control message 500. This overhead data are combined with the call data to form a portion of a TDMA data packet 300, discussed above. This packet will contain call data obtained over the duration of a single frame 206 and some of overhead data 308. In the presently preferred embodiment of the present invention, the packet 300 does not include an LCID value 400 or a routing code 304 when transmitted from MU 600 over link 112 because these items are appended at satellite 700, discussed above. For a continuous stream of call data, the call data is divided into data packets 300. After task 1212, a task 1214 causes transceiver 602 to transmit data packet 300 with the appropriate timing and frequency parameters so that satellite 700 will be able to receive the data packet 300.

After task 1214 or 1208, other background processes useful to the operation of computerized hardware which operate in real time are performed, as indicated in task 1216. Such other processes include the maintaining of clocks and other procedures known to those skilled in the art. After task 1216, program control returns to task 1202 to repeat the Background procedure 1200 to handle additional data flowing into or out from MU 600.

Accordingly, as described above in connection with FIGS. 11-12, MU 600 utilizes LCID values rather than a MU ID value as much as possible to identify itself to network 116 in network control messages 500. This conserves network resources because less data needs to be delivered through network 116. While the savings in network resources with respect to any single MU 600 may be slight, when a population of MUs 600 is considered the savings become considerable. Moreover the LCID value 400 includes an identifier 402 which may desirably be used in routing the message to the appropriate SO 800. An intermediate switching node, such as a satellite 700, need not engage in significant processing in order to successfully and unambiguously deliver the message to the appropriate SO 800.

FIGS. 13-14 show flow charts of procedures performed by a satellite 700 to support call processing through the use of LCID values. As discussed above, satellites 700 in the preferred embodiment of the present invention move at a high rate of speed. Physical communication paths through network 116 change over time due to the movements of satellites 700. Network 116 defines logical channels that do not change, at least through the duration of a call. Accordingly, processing requirements are reduced. However, switching nodes desirably associate logical channels with physical channels so that the communications may be correctly delivered.

With respect to data packets received at a satellite 700 from any individual link 112 and available in an input buffer of switch 712, satellite 700 performs an Individual link switching procedure 1300. A task 1302 evaluates a received communication available at an input buffer of switch 712. For the purposes of procedure 1300, this input buffer may be associated with any traffic channel of transceiver 704 within switch 712. After task 1302, a query task 1304 examines the packet to determine whether it carries a network control message 500 or a call data packet 300. The majority of packets at this point are call data packets 300. When the incoming packet is identified as being a call or traffic packet 300, a task 1306 accesses routing code table 716. In particular, task 1306 performs a mapping operation on table 716 through the address that corresponds to the input buffer from which the data packet 300 was obtained above in task 1302.

After task 1306, a task 1308 finds the routing code 304 and LCID value 400 from table 716 that are associated with the identified input buffer address and the data packet 300 currently being processed. Next, a task 1310 tags or adds the routing code 304 and LCID value 400 with the packet to achieve the format illustrated in connection with FIG. 3. After task 1310, a routine 1311 completes the processing of the data packet by routing the packet in accordance with the routing code. Routine 1311 is discussed below in connection with FIG. 14 as a subset of the tasks performed by procedure 1400.

When task 1304, discussed above, encounters a network control message 500, a control message process 1312 is performed. Generally speaking, process 1312 is performed to deliver a network control message 500 to a nearby SO 800 via a trunk link 104. Within process 1312, a task 1314 evaluates the message 500 to detect a destination ID. The destination ID may, for example, be determined by evaluating an LCID value 400 included in the message 500. The LCID value 400 includes a SO ID 402 that serves to identify a particular SO 800. Alternatively, overhead data 504 may specify any other destination for the message 500, such as a satellite 700. As discussed above, a destination ID is not necessarily included in message 500. For example, a Log-On message 902 may omit such an item. In this situation, task 1314 identifies a primary SO 800 currently being served by satellite 700 as the intended destination. The primary SO 800 preferably changes as satellite 700 moves.

After task 1314, a task 1316 translates the intended destination information obtained above in task 1314 into the identity of a particular trunk 104-106. Next, a task 1318 sends the network control message 500 through that link by queuing the message 500 to an appropriate output buffer 710. After task 1318, program control exits control message process 1312, a task 1320 points to the next received communication, and procedure 1300 repeats to move this next communication to its destination.

With respect to data packets received at a satellite 700 from any trunk link 104-106 and available in an input section of a buffer 710, satellite 700 performs an trunk switching procedure 1400. A task 1402 evaluates a received communication available at an input buffer. For the purposes of procedure 1400, this input buffer may be any buffer 710 of a satellite 700 associated with any trunk transceiver 702.

A query task 1404 checks a routing code 304 included in the packet being processed to determine if it is to be transferred to a trunk link 104-106 or an individual link 112. Except for some network control messages 500 being sent to MUs 600 active for SOs 800 being served by satellite 700, these packets typically include routing codes 304 and LCID values 400.

The routing code 304 preferably carries two items of information. One item identifies which satellite 700 serves as a terminal node in the transmission of the packet. The packet is routed to the earth from this terminal node. The other item identifies the type of down link, either a link 112 or trunk 104 to use in delivering the packet to the earth. If the communication is to be delivered to an individual link 112, it gets routed through switch 712 to the appropriate one of the potential multitude of traffic channels 208 handled by satellite 700.

When task 1404 determines that the communication is to be routed to a trunk 104-106, then a task 1406 copies the communication to the output buffer of the trunk that corresponds to the routing code included in the message. In the preferred embodiment, the communication may be a TDMA data packet or a network control message, and no data is added or removed from the communication. In an alternate embodiment, a portion of the routing code 304 and perhaps some of overhead data 308 or 504 may be removed by task 1406. In either embodiment, an extremely efficient repeating operation results. After task 1406, a task 1408 points to the next received communication, and Switching procedure 1400 repeats to move this next communication toward its destination. On the other hand, if Continue Processing routine 1311 is being performed on behalf of the flow illustrated in FIG. 13, program control returns to procedure 1300.

When task 1404 determines that the communication is to be routed through switch 712 to an individual link 112, a query task 1410 determines whether the communication is a TDMA data packet 300 that carries call data traffic or a network control message (NCM) 500. If the communication carries call data traffic, then procedure 1400 performs a Normal Switch process 1412 to transfer the data packet 300 to the appropriate individual link 112. Process 1412 performs a task 1414 to obtain an output buffer address within switch 712. Task 1414 uses LCID value 400 as a key within table 714. Table look up or parsing techniques known to those skilled in the art may be practiced in using LCID value 400 and LCID table 714 to obtain an output buffer address.

After task 1414, an optional task 1416 may be performed to remove any unnecessary overhead data from data packet 300. Such overhead data may, for example, include LCID value 400 and routing code 304. Such data may be considered unnecessary because it is used by network 116 in routing data packet 300 to a particular MU 600; and, once packet 300 has arrived at MU 600 this data conveys little useful information.

A task 1418 is performed to write the data to the output buffer indicated as a result of task 1416. By writing the packet 300 to the output buffer, the packet 300 will be transmitted over the traffic channel to a MU 600. The particular traffic channel chosen is one that has been assigned to LCID value 400. This assignment is discussed below in connection with task 1424.

Referring back to task 1410, when a communication being switched by satellite 700 is a network control message (NCM), a query task 1420 is performed. Task 1420 examines the message to determine which type of message is being conveyed. When Call-Connected messages 910 are being sent to a MU 600, satellite 700 may interpret such messages as an instruction to assign a traffic channel to the MU 600 to which the message is being sent. In particular, a task 1422 examines LCID table 714 to identify a free traffic channel. A task 1424 then assigns the free traffic channel to the LCID for this end of the call. The LCID value used in task 1424 is the LCID value used by the MU 600 that is on only one end of the call. This LCID value 400 is used in routing communications to the MU 600 receiving the Call-Connected message 910. The assignment may be made by saving the LCID value in LCID table 714 in association with or linked to data describing the address of the output buffer for the free traffic channel.

In addition, a Call-Connected message 910 may include another LCID value 400 that describes the other end of a call and a routing code 304 that network 116 uses in delivering call data packets 300 to this other end. Task 1424 may setup routing code table 716 by saving this other LCID value and routing code in association with the input buffer for the same traffic channel 208 that was identified in connection with the first LCID value. This will allow satellite 700 to append the LCID value 400 and routing code 304 to packets 300 as discussed above in connection with tasks 1306-1310.

After task 1424, a task 1426 adds traffic channel parameters to the Call-Connected message. The traffic channel parameters inform the MU 600 receiving this message of the frequency 202 and time slot 204 that define the selected traffic channel 208. The traffic channel parameters may be obtained, at least in part, through a table look up operation.

After task 1426, a task 1428 writes the message to the control channel 210-212 being used by the MU 600. Task 1428 may optionally remove any routing code included in the message, but the LCID value 400 is left with the message so that the MU 600 receiving the message will be able to determine that the message is intended for it. After task 1428, program control proceeds to task 1408 to process the next received communication.

Referring back to task 1420, when any other type of network control message, other than a Kill-Call message 912, is encountered, program control is routed through control message process 1312, discussed above, to task 1408. Process 1312 copies the message to the appropriate control link, including a link 112, as discussed above.

When task 1420 detects a Kill-Call message 912, Normal Switch process 1412, discussed above, is performed to deliver the message to the intended MU 600 through a traffic channel 208. After process 1412, a task 1430 purges the LCID from LCID table 714 to release the traffic channel used during the call and free the traffic channel for use by other MUs 600. Task 1430 also purges the LCID value and routing code from routing code table 716. Task 1430 may desirably write a predetermined value over the LCID value in tables 714 and 716 to signify that the corresponding traffic channel is now free. After task 1430, program control proceeds to task 1408 to process the next received communication.

Accordingly, as illustrated in FIGS. 13-14, satellites 700 perform their switching function with very little processing complexity in spite of the fact that satellites 700 and constellation 102 are moving. Satellites 700 need not create routing codes on an instant by instant basis. Rather, satellites 700 may simply interpret routing codes and LCID values which pass therethrough. Satellites 700 become involved in selecting physical links only when calls are being setup. In this situation, physical link selections are made only at the one satellite which is directly serving a MU 600. When calls are in progress, satellites 700 need only perform a translation on LCID values to obtain a physical address of a traffic channel to use in delivering a communication to a MU 600. And, this translation need occur only in the single satellite 700 of constellation 102 that is switching a TDMA data packet 300 to an individual link 112. Other switching functions operate even more efficiently. LCID values, which identify logical channels, remain static throughout the duration of a call in spite of physical channel changes.

FIGS. 15-23 show flow charts of procedures performed by SO 800 in support of call processing through the use of LCID values. Generally speaking, SO receives and responds to various messages to support call processing. Messages can be received from MUs 600 which are logging on or logging off network 116. Messages can be received from OMUs 600, which are attempting to originate a call, and messages may be received at DSOs 800 from OSOs 800, and vice-versa. SOs 800 send various messages to these entities in response to the messages that are received. SOs 800, with support from SIMs 114, possess the bulk of the intelligence used in operating network 116. As discussed above, the mobile switching nodes provided by satellites 700 engage in very little processing while transferring messages between MUs 600 and serving SOs 800.

Those skilled in the art will appreciate that SOs 800 may engage in numerous other activities related to the operation of network 116. In addition, while the preferred embodiment of the present invention places the bulk of call processing intelligence in SOs 800, those skilled in the art will appreciate that some of the features described herein as taking place in SOs 800 may desirably be shifted to satellites 700 in particular applications with a corresponding increase in complexity at satellites 700.

Figure 15:
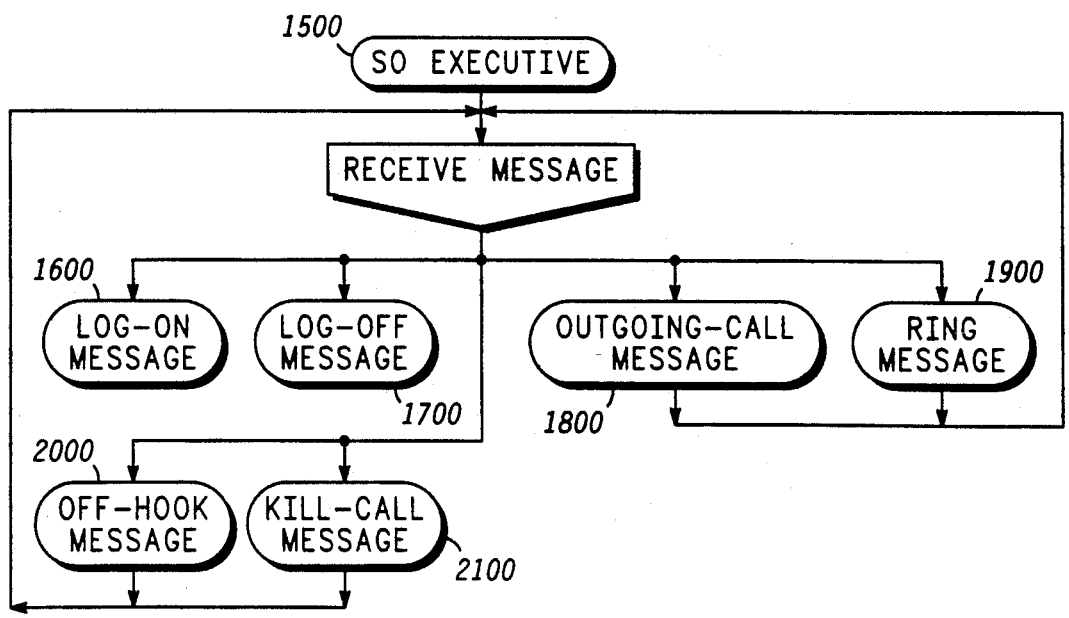
FIGS. 15-23 shows flow charts of procedures performed by switching offices to support call processing through the use of logical channel assignments.

FIG. 15 shows a flow chart of a SO Executive procedure 1500 which SO 800 performs in support of call processing. Procedure 1500 examines network control messages received at SO 800 and switches program control to an appropriate procedure to respond to the received message. Procedure 1500 preferably obtains these messages from a message input buffer of memory 816. The operation of this message input buffer is discussed below in connection with FIGS. 22-23.

Two types of procedures are handled by SO Executive procedure 1500. One type handles registration of MUs 600 with network 116, and another type handles call setup and deactivation. Those skilled in the art will appreciate that all procedures controlled by procedure 1500 may be reentrant. Hence, numerous diverse ones of these procedures may be in progress at any given time with respect to one or more calls being processed, and at any single point in time each of these procedures may be in progress multiple times with respect to different calls. FIGS. 16-21 present flow charts of these procedures.

Figure 16:
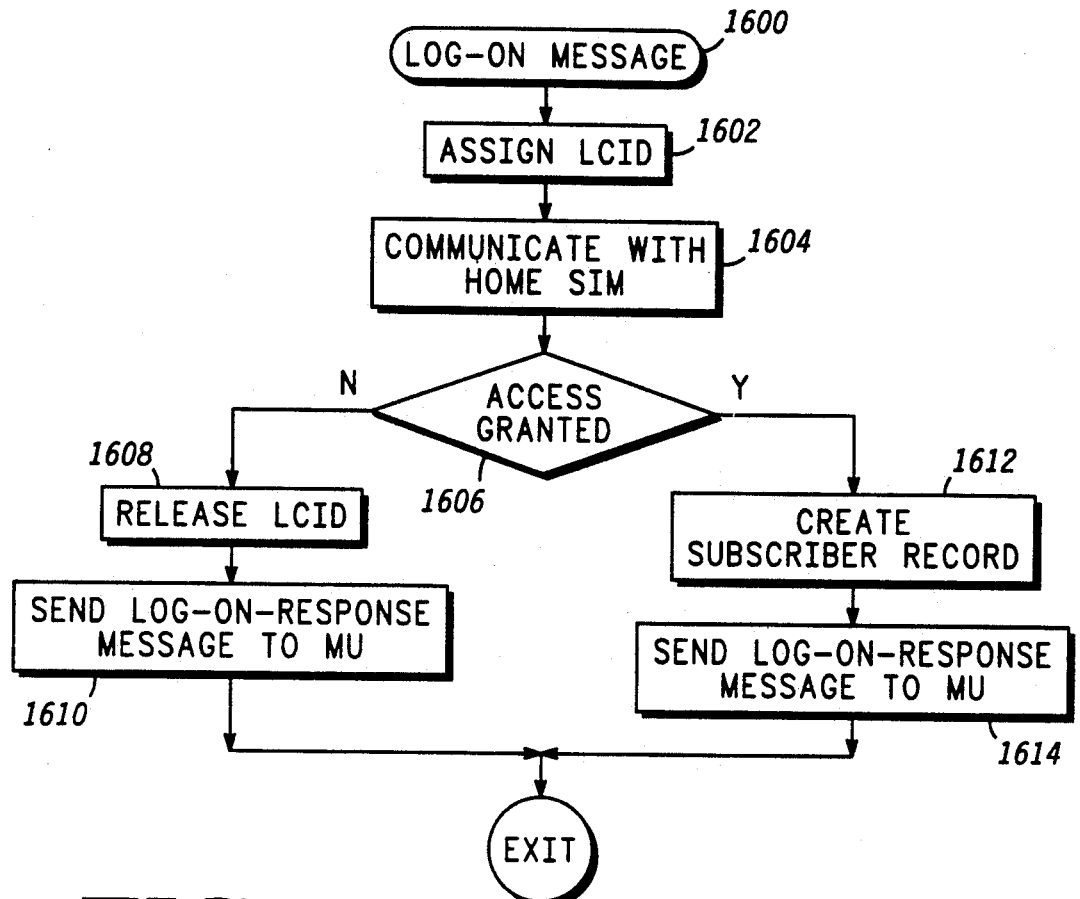

FIG. 16 shows a flow chart of a Log-On message procedure 1600. Procedure 1600 is performed in connection with registering a MU 600 with network 116. SO 800 performs procedure 1600 when a Log-On message 902, discussed above in connection with MU procedure 1000, is received. The receipt of a Log-On message 902 indicates that a MU 600 is attempting to access network 116 to receive communication services.

A task 1602 of procedure 1600 assigns an LCID value 400. The character of LCID value 400 was discussed above in connection with FIG. 4. LCID value 400 will be stored in table 612 of the MU 600 sending the Log-0n message. LCID value 400 may also be stored in LCID table 714 of its overhead satellite 700. It may also be stored in a routing code table 716 of a satellite serving another end of a call which is sending call data packets 300 to this MU 600 or in a routing code table 814 of a SO 800 which is connecting a PSTN line 110 to a call with this MU 600. Task 1602 preferably insures that the assigned LCID value 400 does not duplicate any other LCID value 400 currently in use. This may be performed by forming a table, for all possible LCID values 400 assignable by SO 800, then writing data to the table to indicate whether the LCID values 400 are free for use or have been assigned. In addition, such a table may desirably include fields for storing the MU ID received in message 902. The LCID value 400 assigned at task 1602 may have been previously used in connection with another MU 600 and then released.

After task 1602, a task 1604 communicates with the home SIM 114 assigned to the MU 600 sending message 902. This home SIM 114 keeps records concerning the subscriber to whom MU 600 belongs. Such records may indicate whether the subscriber is paying his or her bills, the subscriber's current location, and to which particular service features the subscriber has subscribed. The communication may be sent through network 116 using a network control message 500 (not shown) if needed. Desirably, the communication will inform the home SIM 114 of the current location of MU 600. The home SIM 114 responds by sending another communication back to SO 800.

A query task 1606 may evaluate this responding communication to determine whether the MU 600 can be granted access to network 116. In addition, SO 800 may evaluate any authentication code supplied by message 902 to aid in this determination. If access cannot be granted, a task 1608 releases the LCID value 400 assigned above in task 1602. This LCID value may be released by writing a predetermined value to the above-discussed table. After the LCID value has been released, it may be reused. After task 1608, a task 1610 sends Log-On-Response message 904 back to MU 600. In this situation, message 904 includes the MU ID obtained from message 902 and conveys the fact that access to network 116 is being denied. After task 1610, program control returns to SO Executive procedure 1500 to evaluate another network control message received at SO 800.

When task 1606 determines that access to network 116 can be granted, a task 1612 creates a subscriber record for the MU 600. This subscriber record may desirably store the MU ID 614 for the MU 600, the LCID value 400 assigned above in task 1602, data describing features associated with the MU 600, data indicating the current status of the MU 600, and any other data deemed useful in providing communication services to MU 600. After task 1612, a task 1614 sends Log-On-Response message 904 back to MU 600. In this situation, message 904 includes the MU ID obtained from message 902 and conveys the fact that access to network 116 is granted. In addition, message 904 includes the LCID value 400 assigned above in task 1602. As discussed above, this LCID value 400 will be used by MU 600 to determine when network control messages are intended for MU 600 and by SO 800 to determine the identity of a MU 600 sending a network control message to SO 800. By using LCID value 400 rather than MU ID 614 as an identifier for MU 600, network resources are conserved. After task 1614, program control returns to SO Executive procedure 1500 to evaluate another network control message received at SO 800.

Figure 17:
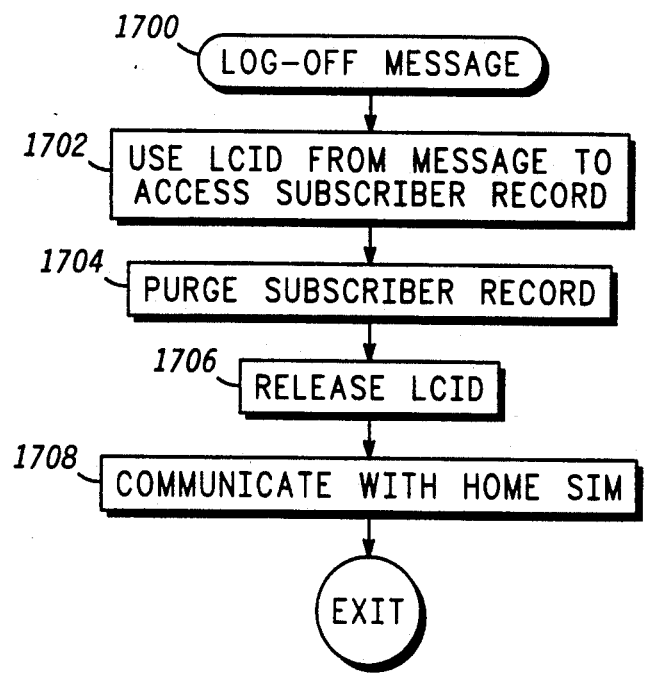

FIG. 17 shows a flow chart of a Log-Off message procedure 1700. Procedure 1700 is also performed in connection with managing the registration of a MU 600 with network 116. SO 800 performs procedure 1700 when a Log-Off message 916, discussed above in connection with MU procedure 1110, is received. The receipt of a Log-Off message 916 indicates that a MU 600 is de-energizing and no longer requires communication services from network 116.

Procedure 1700 performs a task 1702 to access the subscriber record associated with the MU 600 sending Log-Off message 916. Message 916 conveys an LCID value 400, and this LCID value 400 may be used as a key in selecting the appropriate subscriber record. After task 1702, a task 1704 purges this subscriber record so that SO 800 no longer lists MU 600 as being served by SO 800. A task 1706 releases the LCID value 400 associated with the MU 600. As discussed above, by releasing LCID value 400, the same value may be reused in connection with other MUs 600 or calls. After task 1706, a task 1708 communicates with the home SIM 114 for the MU 600 to inform the SIM 114 that the MU 600 is now logged off network 116. After task 1708, program control returns to SO Executive procedure 1500 to evaluate another network control message received at SO 800. SO 800 may now assign the LCID value released in task 1706 to another user of network 116.

Figure 18:
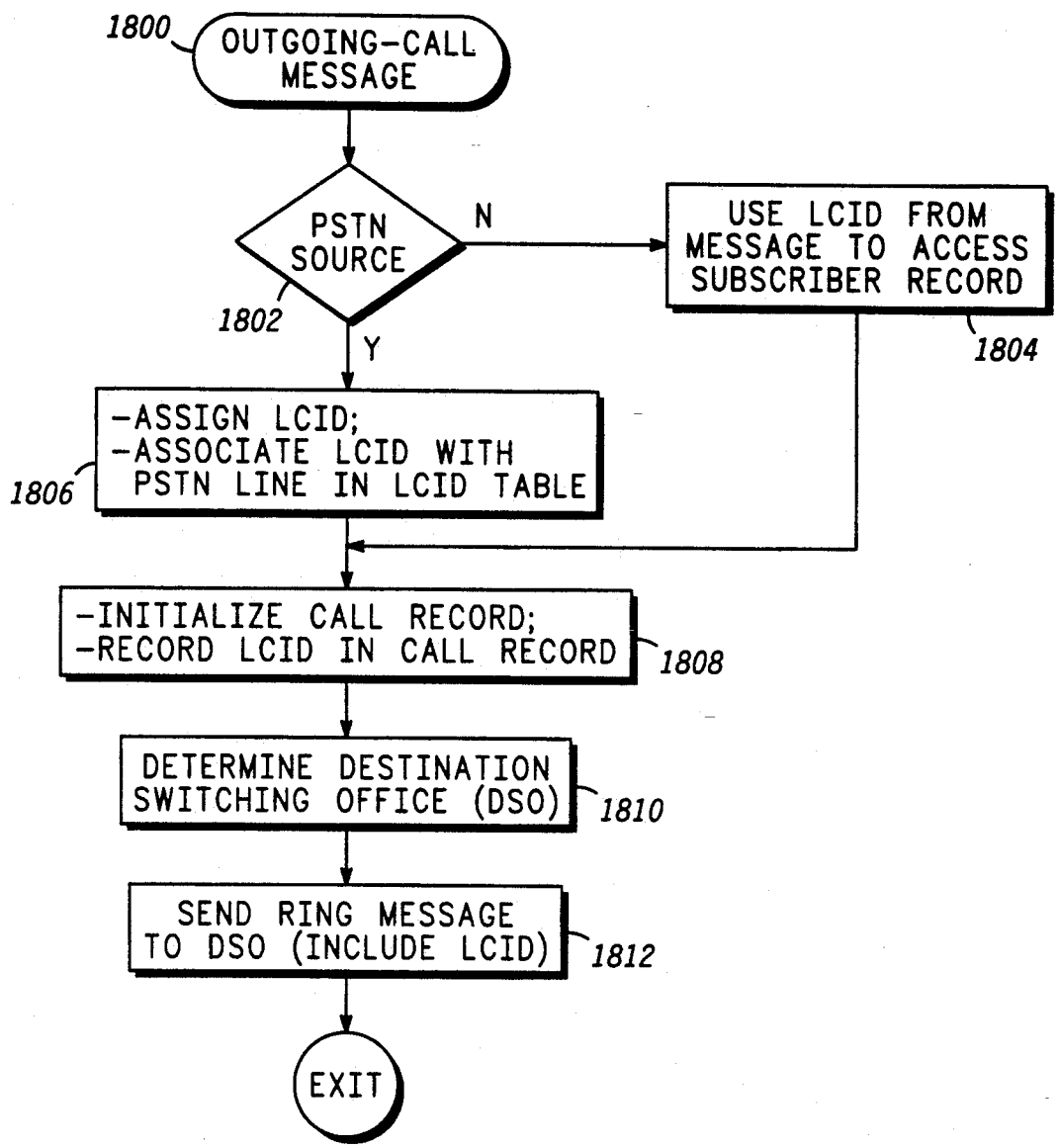

FIG. 18 shows a flow chart of an Outgoing-Call message procedure 1800. Procedure 1800 is performed in connection with setting up a call. SO 800 performs procedure 1800 when an Outgoing-Call message 914, discussed above in connection with MU procedure 1108, is received. Message 914 is received at a SO 800 from a MU 600 attempting to originate a call (an OMU). Message 914 identifies OMU 600 through the use of its LCID value 400 and provides a destination ID, which identifies the party being called. Procedure 1800 is also performed when a call is received from PSTN 108. When SO 800 performs procedure 1800, it acts as a call originating SO (OSO).

Procedure 1800 performs a query task 1802 to determine whether Outgoing-Call message 914 originated from a MU 600 or as a result of a call placed to SO 800 at a PSTN line 110. When message 914 comes from a MU 600, a task 1804 uses the LCID value 400 as a key for accessing the subscriber record for MU 600. When message 914 results from a PSTN originated call, as discussed below in connection with FIG. 23, no LCID value exists for the call. Thus, a task 1806 obtains an LCID value 400 for use in connection with the upcoming call. Task 1806 follows the guidelines discussed above in connection with task 1602 in assigning an LCID value 400. The assigned LCID value 400 may have been previously used by either a PSTN line 110 or a MU 600. Task 1806 additionally associates the assigned LCID value 400 with the PSTN line 110 on which the call was received. This association may be made by storing the LCID value or an identifier for the PSTN line 110 in LCID table 812. Table 812 can then operate in a manner similar to that described above in connection with LCID table 714 of satellite 700.

After tasks 1804 or 1806, a task 1808 initializes a call record for the upcoming call and records the LCID value associated with the originating party to the call in that call record. When an OMU 600 is originating a call, the call record may additionally record the MU ID for OMU 600. When a PSTN line 110 is originating a call, the call record may additionally record the identity of the PSTN line 110. This call record may additionally include data conventionally included in telephony call records. Such call records are used for billing purposes and for obtaining network usage statistics.

After task 1808, a task 1810 determines the destination SO 800 to be used in setting up the call. When the call is to be placed to a PSTN phone number, a table look up operation may be performed to determine which SO 800 within network 116 best serves the indicated phone number. When the call is to be placed to a MU 600, then the DMU 600 is first located. A DMU 600 may be located, for example, by communicating with the home SIM 114 for the DMU 600. This home SIM 114 may be identified by examining the MU ID for the DMU 600. This MU ID is included in message 914. The home SIM 114 may advantageously maintain a record of the last known location for each MU 600 assigned thereto. Communications, such as that discussed above in connection with task 1604, may take place between MUs 600 and network 116 so that this data remains current at home SIMs 114. The home SIM 114 can respond with the location of the DMU 600. In addition, the home SIM 114 can respond with the LCID value 400 currently in use by the DMU 600. OSO 800 may then use this location information to find DSO 800.

After task 1810 has identified the DSO 800, a task 1812 sends a Ring message 918 to DSO 800. Ring message 918 includes the LCID value 400 associated with the originator of the call and information which identifies the called party. The LCID value 400 associated with the originator of the call causes the destination unit or another device near the destination end of the call to include the originator's LCID value 400 in TDMA data packets 300 transmitted to the originator of the call. When the originator is an OMU 600, satellite 700 uses the originator's LCID value 400 in switching data packets 300 to an appropriate traffic channel 208, as discussed above. When the originator is a PSTN line 110, OSO 800 uses the LCID value in an analogous manner, as discussed below in connection with FIG. 22. The destination unit information may be in the form of a phone number if the called party is a PSTN phone number or an LCID value 400, obtained from home SIM 114, if the called party is a DMU 600. As discussed above, the use of an LCID value to identify a MU 600 is preferable to the use of a MU ID because it conserves network resources. After task 1812, program control returns to SO Executive procedure 1500 to evaluate another network control message received at SO 800.

Figure 19:
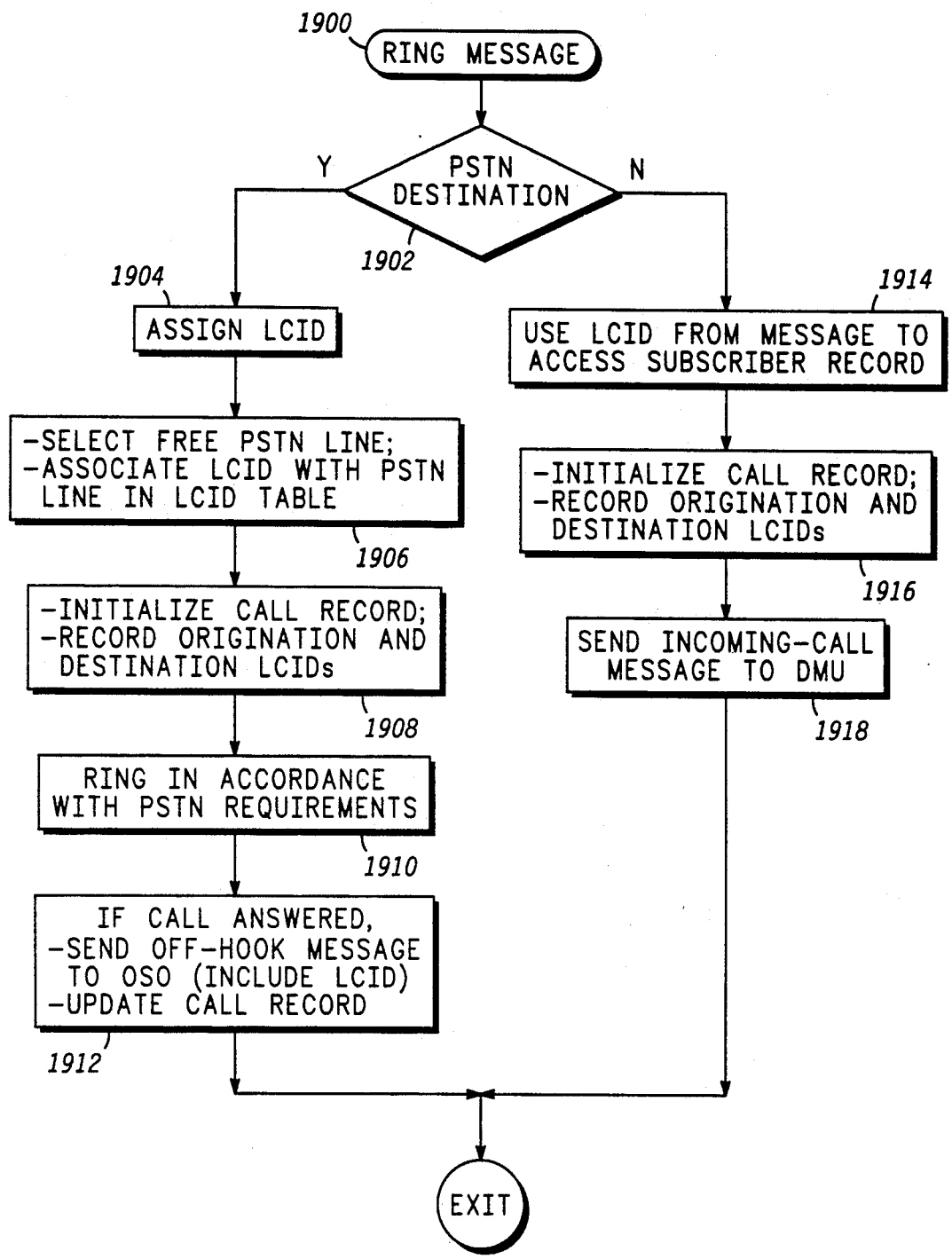

FIG. 19 shows a flow chart of a Ring message procedure 1900. Procedure 1900 is performed to support call setup. SO 800 performs procedure 1900 when a Ring message 918, discussed above in connection with OSO procedure 1800, is received. Message 918 is received at a SO 800 from an OSO 800 that is attempting to originate a call. Message 918 is routed to a SO 800 because that SO 800 has been determined to be the destination SO 800 (DSO) for a call that is being setup. DSO 800 may provide access to PSTN 108 or a DMU 600. Message 918 carries data that identify the OSO 800 which sent message 918 and the LCID value 400 associated with the originating party. Message 918 additionally provides a destination ID. The destination ID identifies the party being called.

Procedure 1900 initially performs a query task 1902. Task 1902 examines the destination ID carried by message 918 to determine whether the call is destined for PSTN 108 or a DMU 600. If the call is destined for a PSTN phone number, a task 1904 assigns an LCID value 400 to the call using the guidelines discussed above in connection with task 1602. Next, a task 1906 selects a free PSTN line 110 and associates the LCID value 400 assigned in task 1904 to this PSTN line 110. This association may be made by storing either data identifying the PSTN line 110 or the LCID value 400 in LCID table 812.

A task 1908 initializes a call record for the upcoming call. Task 1908 records both origination and destination LCID values 400 in the call record along with the identity of the PSTN line 110 used in setting up the call. In addition, routing code table 814 is setup with the LCID and routing code for outgoing calls. A task 1910 then "dials" the PSTN phone number over the selected PSTN line 110 in a manner which complies with the requirements of the PSTN 108 coupled to DSO 800. If the call is answered on the selected PSTN line 110, a task 1912 sends Off-Hook message 908 to OSO 800. This Off-Hook message 908 carries the LCID value 400 assigned above in task 1904. Task 1912 additionally updates the call record for the call to indicate that the call was answered and to record the time. After task 1912, program control returns to SO Executive procedure 1500 to evaluate another network control message received at SO 800.

Referring back to task 1902, when a Ring message 918 is encountered which indicates that a DMU 600 is the called party, a task 1914 uses the called party's LCID value 400 from message 918 to access the indicated DMU's subscriber record. A task 1916 then initializes a call record for the call and records the origination and destination LCID values 400 therein along with the DMU's MU ID, obtained from the subscriber record. After task 1916, a task 1918 sends Incoming-Call message 906 to the indicated DMU 600. Incoming-Call message 906 was discussed above in connection with procedure 1106. As discussed therein, message 906 omits the DMU's MU ID as an identifier for DMU 600 and uses the DMU's LCID value 400 instead to conserve network resources. After task 1918, program control returns to SO Executive procedure 1500 to evaluate another network control message received at SO 800. The answering of an incoming call at DMU 600 will be recognized when Off-Hook message 908 is received from DMU 600 at DSO 800.

Figure 20:
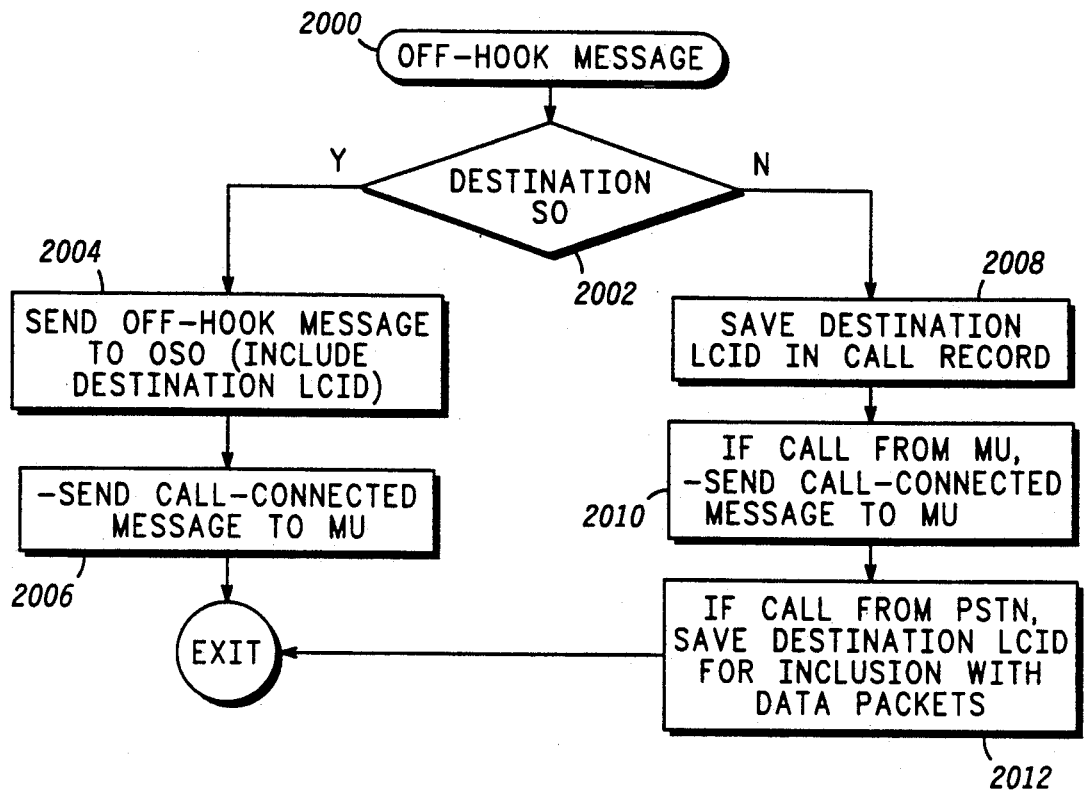

FIG. 20 shows a flow chart of an Off-Hook message procedure 2000. A DSO 800 performs procedure 2000 when an Off-Hook message 908 is received from a DMU 600. As discussed above in connection with MU procedure 1106, a DMU 600 responds with Off-Hook message 908 when a user of DMU 600 answers the call. Off-Hook message 908 conveys the identity of DMU 600 through its LCID value 400. In addition, an OSO 800 performs procedure 2000 when an Off-Hook message 908 is received from a DSO 800.

Accordingly, a query task 2002 determines whether SO 800 is operating as a DSO or OSO for the call. When SO 800 is operating as a DSO, message 908 originated from a DMU 600. When SO 800 operates as a DSO, a task 2004 sends Off-Hook message 908 on to the OSO 800 involved with the call. Message 908 carries the DMU's LCID value 400, and this LCID value may be used as a key to the DMU's subscriber record and call record to determine the routing code 304 for the appropriate OSO 800. Task 2004 causes the DMU's LCID value 400 to be included in the message 908 that it sends to OSO 800. After task 2004, a task 2006 sends a Call-Connected message 910 to DMU 600. As discussed above, message 910 carries the LCID value 400 of the call originator. This inclusion of originator LCID value 400 causes a satellite 700 to use the LCID value 400 in routing code table 716 for inclusion in data packets 300 sent to the originator of the call. Message 910 additionally includes the LCID value 400 of the DMU 600 to which message 910 is being sent for use as an identifier. The satellite 700 directly serving DMU 600 may intercept message 910 to aid in the assignment of a traffic channel 208, as discussed above in connection with tasks 1422-1428. After task 2006, program control returns to SO Executive procedure 1500 to evaluate another network control message received at SO 800.

Referring back to task 2002, when SO 800 is not serving as a DSO for the call, i.e. is serving as an OSO, a task 2008 saves the destination LCID value 400 in the call record for the call and in routing code table 814. The call originator may be either an OMU 600 or a PSTN line 110. If the call originator is an OMU 600, a task 2010 sends Call-Connected message 910 to OMU 600. Message 910 includes the LCID value 400 associated with the destination or called party for use in routing code table 716. This causes data packets 300 to be sent to the called party. It may also send LCID value 400 associated with OMU 600 for incorporation in LCID table 714. If the call originator is a PSTN line 110, a task 2012 saves the destination LCID value 400 for inclusion with data packets to be sent from OSO 800 to the called party. After task 2012, program control returns to SO Executive procedure 1500 to evaluate another network control message received at SO 800.

Figure 21:
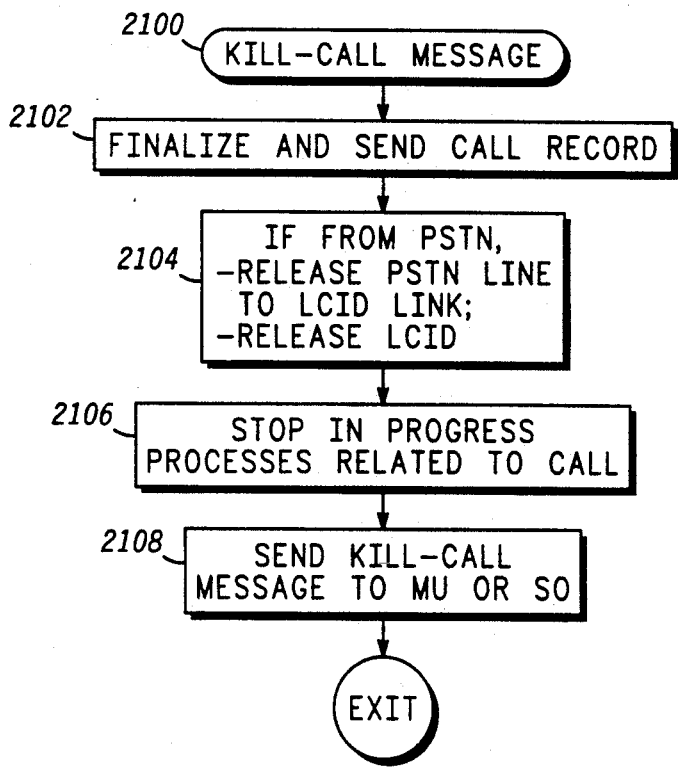

FIG. 21 shows a flow chart of a Kill-Call message procedure 2100. SO 800 performs procedure 2100 when a Kill-Call message 912 is received. Message 912 may be received from a MU 600 or another SO 800 and may be received while SO 800 is acting as an OSO or a DSO. As discussed above, Kill-Call message 912 indicates that the call setup process, or call if it is in progress, needs to be terminated.

Procedure 2100 performs a task 2102 to finalize and send the call record SO 800 has been making with respect to the present call. The call record is sent to an entity of environment 100 that has responsibility for collecting statistics of network usage and/or billing. However, nothing requires task 2102 to send the call record instantly, and call records may be batched for transmission over network 116 at times of low traffic. Call records include the permanent identifier of at least one party to the call, such as a MU ID or a PSTN line, the times at which the call took place, and LCID values 400 for the calling and called party. Each SO 800 attending to the call keeps its own version of the call record. The entity responsible for compiling call records can use LCID values and times to associate corresponding call records for a single call. The use of two call records for each call provides redundancy in collecting network usage information so that reliable information results.

If SO 800 has a PSTN line 110 assigned to the call, a task 2104 releases the PSTN line and the LCID value 400 assigned to the PSTN line. The LCID value 400 then becomes free for assignment to another PSTN line or MU 600. On the other hand, if an LCID value 400 is assigned to a MU 600, that LCID value is not released upon termination of a call. Rather, the MU 600 continues to use the LCID value so long as it remains registered with network 116. Of course, nothing prevents a SO 800 from reassigning a new LCID value if it chooses to do so.

A task 2106 stops all in-progress processes related to the call. Such processes may, for example, be waiting for a ringing line or DMU 600 to indicate an off hook condition. A task 2108 sends the Kill-Call message 912 on to either its served MU 600 or partner SO 800 in the present call. As discussed above, MU IDs are omitted from transmissions of message 912. After tasks 2102-2108, the call is deactivated and program control exits procedure 2100 and returns to SO Executive procedure 1500 to process the next received network control message.

Figure 22:
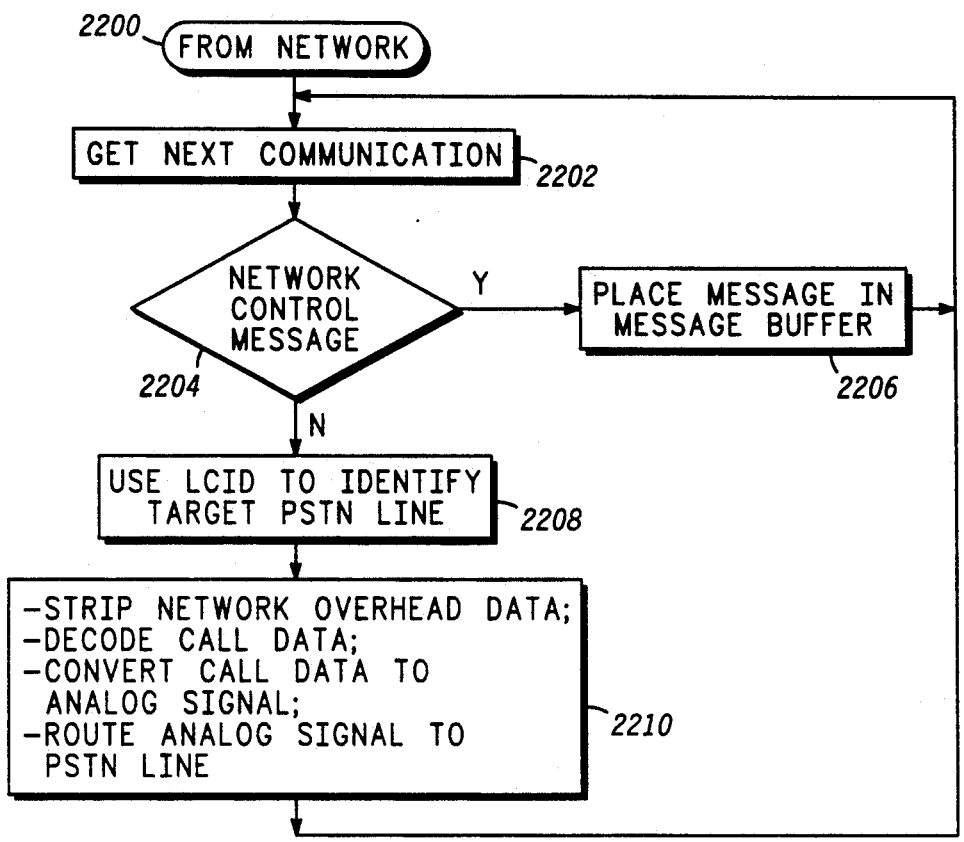

FIG. 22 shows a flow chart of a From Network procedure 2200, which handles communications received from network 116 at trunk link 104 or otherwise. A task 2202 gets the next communication which has been received at SO 800. After task 2202, a query task 2204 evaluates the communication to determine whether it is a network control message 500 or a TDMA data packet 300. If the communication is a network control message 500, a task 2206 removes unnecessary overhead data and places the message in the input message buffer so that SO Executive procedure 1500 will evaluate the message in due course. After task 2206 program control returns to task 2202 to process the next communication.

When task 2204 determines that the communication is a TDMA data packet 300, then a task 2208 uses the LCID value 400 from packet 300 to identify a target PSTN line 110. Task 2208 may access LCID table 812 to identify the appropriate PSTN line 110. After task 2208, a task 2210 converts the packet 300 into a signal compatible with the requirements of PSTN 108. For example, task 2210 strips any network overhead data from packet 300. This overhead data may be tested to determine whether it represents a network control message, such as a Kill-Call message 912, and routed to the input message buffer when appropriate. Task 2210 may additionally decode or decompress any call data carried by packet 300, convert the call data into an analog signal, and route the analog signal to the PSTN line 110 identified above in task 2208. After task 2210, program control returns to task 2202 to process another communication.

Figure 23:
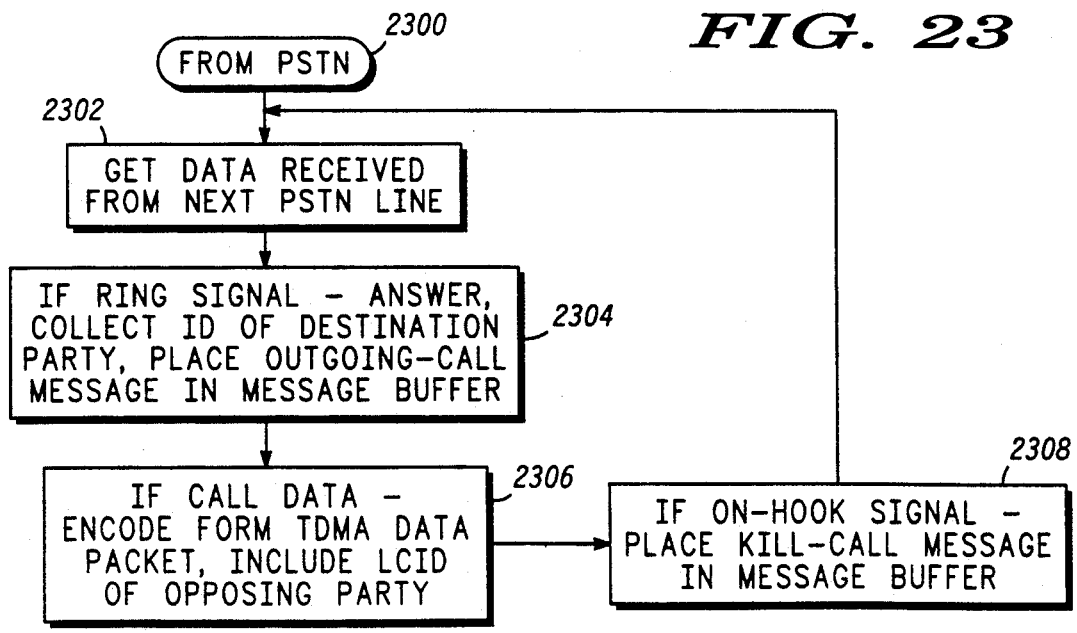

FIG. 23 shows a flow chart of a From PSTN procedure 2300, which handles communications received from PSTN 108 over a PSTN line 110. A task 2302 obtains any data present on a next PSTN line 110 being evaluated by procedure 2300. If data from a PSTN line 110 indicates that a ring signal is present, a task 2304 answers the line 110 and an ID of the destination party is collected from the party placing the call. The collection of this destination party ID may desirably be performed through the use of a conventional interactive voice response system. When the destination party's identification has been obtained, task 2304 forms an Outgoing-Call message 914 to describe the call being placed and places message 914 in the input message buffer of SO 800 for evaluation by SO Executive procedure 1500.

If data from a PSTN line 110 is call data, a task 2400 digitizes and encodes a frame of such data. The frame of data is then formatted into a TDMA data packet 300 and combined with an appropriate routing code 304 and opposing party's LCID value 400 from routing code table 814. This data packet 300 is placed in a queue for transmission over trunk link 104.

If data from a PSTN line 110 indicates an on-hook signal, a task 2308 forms a Kill-Call message 912 and places the message in the input message buffer of SO 800 for evaluation by SO Executive procedure 1500. After task 2308, program control returns to task 2302 to evaluate the next one of PSTN lines 110.

In summary, the present invention provides an improved method of identifying communication channels within a communication network. The communication channels are identified in a logical sense rather than a physical sense through the use of LCID values 400. The use of LCID values 400 in network control messages 500 conserves network resources because less data are communicated than are required for transporting an ID value permanently associated with a MU 600. In addition, the use of LCID values 400 in TDMA data packets 300 conserves network resources while simultaneously reducing processing requirements at end switching nodes. Processing requirements are reduced because end switching nodes need not continually determine which physical communication channels to use in transporting a communication. The reduction of processing requirements is particularly desirable in connection with movingorbit satellite switching nodes because it reduces satellite complexity. This reduction in complexity translates into increased reliability, reduced power consumption, reduced weight, and lower cost.

The present invention has been described above with reference to preferred embodiments. However, those skilled in the art will recognize that changes and modifications may be made in these preferred embodiments without departing from the scope of the present invention. For example, those skilled in the art will appreciate that the network may alternatively assign and release LCID values to MUs upon call setup and termination, respectively, as is described above in connection with PSTN line calls. In addition, those skilled in the art will understand that cross connect switches need not include separate input and output buffers, but may include a single buffer having input and output pointers thereto. Moreover, those skilled in the art will appreciate that the present invention may be expanded by allowing satellites to substitute their own traffic LCID values for the ones supplied by a SO 800 so that the satellites may more efficiently obtain output buffer addresses in task 1314, described above. Alternatively, functions discussed herein may be shifted among the various devices discussed herein. For example, MUs rather than satellites may manage and append routing codes and LCID values to call data packets. These and other changes and modifications which are obvious to those skilled in the art are intended to be included within the scope of the present invention.

What is claimed is:

1. A method of operating a device used in electronically communicating call data through a communications network, said method comprising the steps of:
    receiving a network control message from said network, said message conveying a logical channel identification value for use in transmitting call data during a call;
    obtaining call data for transmission through said network during said call; and
    sending a call data communication to said network, said call data communication including said logical channel identification value and said call data.

2. A method as claimed in claim 1 wherein:
said obtaining step comprises the step of dividing said call data into time division multiple access data packets; and
said sending step comprises the step of including said logical channel identification value with each of said time division multiple access data packets.

3. A method as claimed in claim 1 wherein:
said device is an intermediate switching node of said communications network;
said method additionally comprises the step of storing said logical channel identification value in association with one of a plurality of traffic channels supported by said intermediate switching node; and
said obtaining step receives said call data through said one of said plurality of traffic channels.

4. A method as claimed in claim 3 additionally comprising the step of forming a data packet to include said call data from said obtaining step and said stored logical channel identification value.

5. A method of operating a first communication unit to facilitate calls between said first communication unit and other units accessible through a communications network, said method comprising the steps of:
    (a) associating a substantially permanent identification value with said first communication unit;
    (b) sending said substantially permanent identification value to said network;
    (c) receiving a logical channel identification value from said network in response to said step (b); and
    (d) sending a network control message to said network, said network control message including said logical channel identification value as an identifier for said first communication unit.

6. A method as claimed in claim 5 wherein: said step (d) includes a step of:
    transmitting said network control message over a broadcast channel accessible to said first communication unit and said other units; said method additionally comprising steps of:
    sending a second network control message to said first communication unit from said communication network, said second message being transmitted over said broadcast channel; and
    monitoring said broadcast channel to detect said logical channel identification value.

7. A method of operating a switching node of a communications network having a plurality of switching nodes, said network serving to communicate time division multiple access data packets with a communication unit, said method comprising the steps of:
    setting up a call through said communications network with said communication unit, said call comprising sending data packets to said communication unit from said communications network and sending data packets from said communications network to said communication unit;
    obtaining a logical channel identification value;
    storing said logical channel identification value so that an association is formed between said logical channel identification value and data related to said call; and
    causing said logical channel identification value to be included with data packets sent to said communication unit, said logical channel identification value being used by said network in routing said data packets to said communication unit.

8. A method as claimed in claim 7 wherein time division multiple access data packets are additionally communicated with a second communication unit, and said method additionally comprises the steps of:
    releasing said association between said logical channel identification value and said call;
    setting up a second call through said communication network with said second communication unit;
    obtaining said released logical channel identification value;
    storing said released logical channel identification value so that an association is formed between said released logical channel identification value and data related to said second call; and causing said released logical channel identification value to be included with data packets sent to said second communication unit.

9. A method as claimed in claim 7 wherein said communication unit is one of a population of mobile units and has a substantially permanent identification value associated therewith, said substantially permanent identification value uniquely identifying said one mobile communication unit within said population of mobile communication units and said substantially permanent identification value having a predetermined length, and wherein said method additionally comprises the steps of:

receiving said substantially permanent identification value from said one mobile communication unit prior to said obtaining step;

assigning said logical channel identification value; and storing said substantially permanent identification value so that said association includes said substantially permanent identification value.

10. A method as claimed in claim 9 wherein said assigning step comprises the step of configuring said logical channel identification value to have a length which is smaller than said predetermined length of said substantially permanent identification value.

11. A method as claimed in claim 9 wherein said logical channel identification value is one of a multiplicity of logical channel identification values present in said communications network and said assigning step comprises the step of configuring said one logical channel identification value so that said one logical channel identification value is unique among said multiplicity of logical channel identification values.

12. A method as claimed in claim 9 wherein:

said receiving step including the step of obtaining a first network control message conveying a request for logging said communication unit of said communication network, said first message including said substantially permanent identification value; and said method additionally comprises, after said assigning step, the step of sending a second network control message to said communication unit, said second message including said logical channel identification value.

13. A method as claimed in claim 12 additionally comprising the steps of:

deactivating said call; and receiving, after said deactivating step, a third network control message conveying a request for setting up a second call, said third message including said logical channel identification value for use in identifying said one mobile communication unit as the one of said population of mobile communication units requesting to place said second call.

14. A method as claimed in claim 9 additionally comprising the steps of:

receiving a first network control message conveying a request for logging said mobile communication unit off said network; and releasing, in response to said receiving a first network control message step, said logical channel identification value from said association.

15. A method as claimed in claim 7 wherein:

said communication unit is one of a population of mobile communications units and has a substantially permanent identification (ID) value associated therewith, said substantially permanent identification value uniquely identifying said one mobile communication unit within said population of mobile communications units and said substantially permanent identification value having a predetermined length;

said method additionally comprises the step of assigning said logical channel identification value so that said logical channel identification value is configured to have a length which is smaller than said predetermined length; and said method additionally comprises the step of communicating network control messages within said network, said network control massages conveying data related to said one mobile communication unit, and said network control messages including said logical channel identification value for use in identifying said one mobile communication unit.

16. A method as claimed in claim 15 wherein said communicating step comprises the step of omitting said substantially permanent identification value from said network control messages so that the amount of data included in said messages is reduced when compared to the amount of data required to include said substantially permanent identification value, rather than said logical channel identification value, for identification of said one mobile communication unit.

17. A method as claimed in claim 7 wherein a second communication unit couples through a public switched telecommunications network to one of plurality of public switched telecommunications network lines at said node, and said method additionally comprises the steps of:

assigning a second logical channel identification value;

storing said second logical channel identification value so that an association is formed among said second logical channel identification value, data related to said call, and data related to said one public switched telecommunications network line;

receiving a multiplicity of time division multiple access data packets from said network, wherein a portion of said multiplicity of data packets includes said second logical channel identification value;

evaluating said multiplicity of data packets to detect said portion of said data packets;

converting said portion of said data packets into a signal which is compatible with said public switched telecommunications network line; and routing said signal to said public switched telecommunications network line, said public switched telecommunications network line being selected from said plurality of public switched telecommunications network lines in response to said second logical channel identification value.

18. A method as claimed in claim 7 wherein:

said obtaining step is performed a multiplicity of times to obtain a multiplicity of logical channel identification values for use in connection with a multiplicity of communication units; and said obtaining step comprises the step of configuring each logical channel identification value to include a predetermined value therein, said predetermined value uniquely identifying said switching node within said communications network.

* * * * *